(12) United States Patent
Kerlin, IV et al.

(10) Patent No.: US 7,034,499 B2
(45) Date of Patent: Apr. 25, 2006

(54) ELECTROMAGNETIC MOTOR

(75) Inventors: John Harnsworth Kerlin, IV, Provo, UT (US); Kortney Sandberg, West Jordan, UT (US)

(73) Assignee: RT Patent Company, Inc., Wilmington, DE (US)

( * ) Notice: Subject to any disclaimer, the term of this patent is extended or adjusted under 35 U.S.C. 154(b) by 0 days.

(21) Appl. No.: 10/952,663

(22) Filed: Sep. 29, 2004

(65) Prior Publication Data

US 2005/0073281 A1 Apr. 7, 2005

Related U.S. Application Data

(60) Provisional application No. 60/508,438, filed on Oct. 3, 2003.

(51) Int. Cl.
*H02P 1/42* (2006.01)

(52) U.S. Cl. ................ 318/749; 318/751; 318/747; 318/752

(58) Field of Classification Search ............. 310/68 A; 318/749, 751, 747, 752, 794, 254, 771, 245, 318/252, 716, 721, 732, 138, 439
See application file for complete search history.

(56) References Cited

U.S. PATENT DOCUMENTS

| 3,611,082 | A |   | 10/1971 | Schmitz |
| 5,057,763 | A | * | 10/1991 | Torii et al. ................ 322/8 |
| 5,306,996 | A |   | 4/1994 | Yang |
| 5,757,164 | A | * | 5/1998 | Yoshizaki et al. ........... 322/8 |
| 6,093,987 | A | * | 7/2000 | Bukoschek et al. ....... 310/68 A |
| 6,541,943 | B1| * | 4/2003 | Wylie et al. ................ 322/28 |

FOREIGN PATENT DOCUMENTS

DE 3645016 A1 9/1988
GB 1309034 A 3/1973

* cited by examiner

*Primary Examiner*—Karen Masih
(74) *Attorney, Agent, or Firm*—Jones Day

(57) ABSTRACT

An electromagnetic motor with increased torque. The motor has a rotor coil configured to generate a magnetic field. At least two stator coils are connected in series with the rotor coil. Each of the stator coils is configured to generate a respective magnetic field. The motor further includes a plurality of switches configured to generate the magnetic field in each of the respective rotor and stator coils. The switches are configured to generate the magnetic field in the stator coils such that the rotor coil rotates in response thereto. By having the rotor and stator coils connected in series, the torque of the motor is increased.

20 Claims, 9 Drawing Sheets

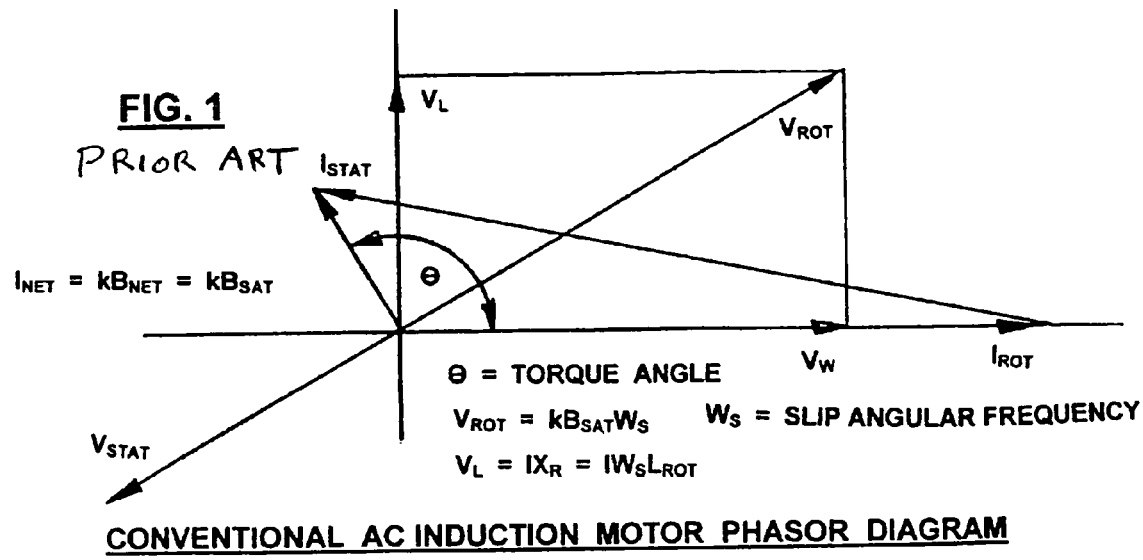
CONVENTIONAL AC INDUCTION MOTOR PHASOR DIAGRAM
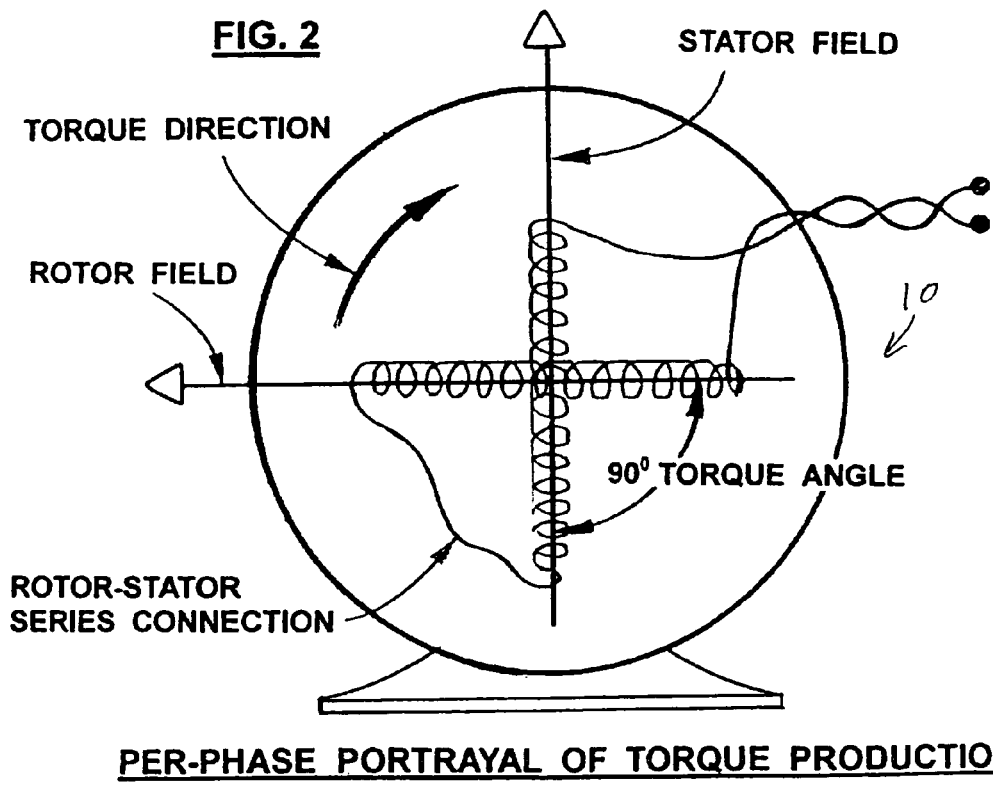
PER-PHASE PORTRAYAL OF TORQUE PRODUCTION

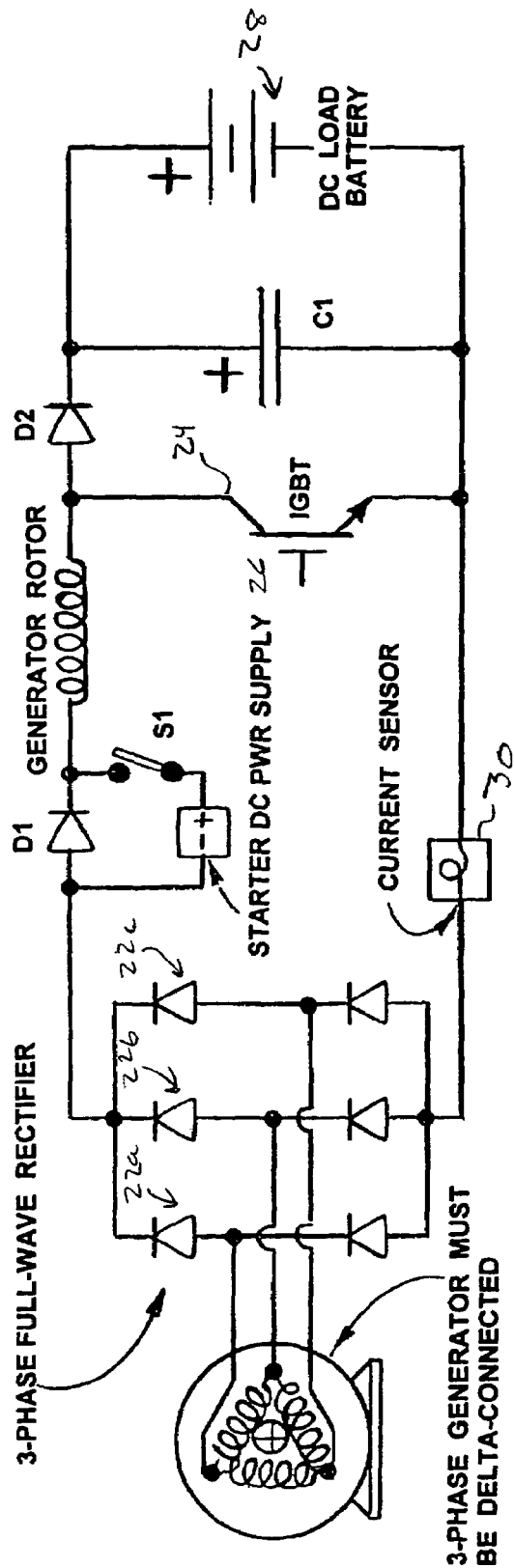
FIG.6
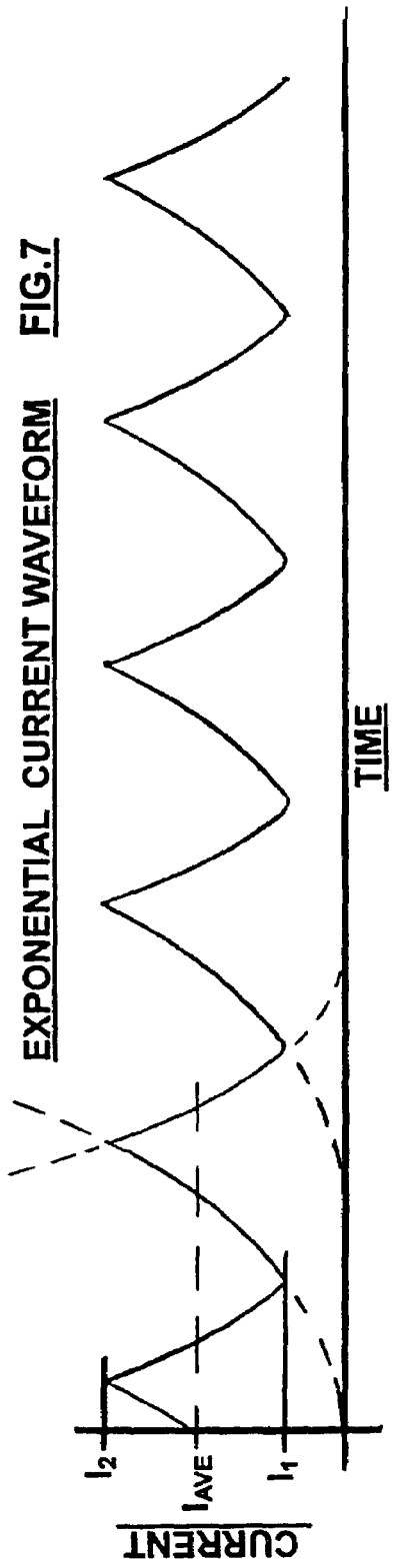
EXPONENTIAL CURRENT WAVEFORM FIG.7

CONVENTIONAL 2-POLE, 3-PHASE WINDING PATTERN

CONVENTIONAL 4-POLE, 3-PHASE, WINDING PATTERN

OPTIMIZED 2-POLE, 3-PHASE, WINDING PATTERN

OPTIMIZED 4-POLE, 3-PHASE, WINDING PATTERN

ELECTROMAGNETIC MOTOR

RELATED APPLICATION

This application claims the benefit of U.S. Provisional Application No. 60/508,438, filed Oct. 3, 2003, the contents of which are incorporated by reference herein.

BACKGROUND OF THE INVENTION

Three main motor types dominate today's motor market: 1) AC Induction motor; 2) Brush-type DC motor; 3) Brushless DC motor. Each of these will be discussed in some detail to highlight distinctive characteristics of the DC motor of the present invention.

AC Induction Motor:

The AC induction motor may be modeled essentially as a rotating transformer where the primary coil represents the stator and the rotor serves as the secondary coil comprising one turn. Acting as a transformer, rotor (secondary) current is the result of voltage induced by a changing magnetic field created by the stator (primary). Stator and rotor are linked magnetically by an iron core (magnetic circuit) that conducts magnetic flux through both the rotor and stator windings. Ideally this magnetic circuit should offer little impedance to magnetic flux, in other words, be of high permeability and low reluctance. Actual reluctance in a real machine requires magneto-motive force (MMF) to drive flux through the magnetic circuit in much the same way that electromotive force (EMF or voltage) is required to drive electricity through an electric circuit. Electrical energy for magnetizing the core is added and removed to the magnetic circuit repetitively with each electrical half-cycle. Because it produces no work, either as heat or mechanical shaft power, this circulating energy is referred to as reactive power and the associated current as reactive current or magnetizing current.

Purely reactive current produces no real work (heat or mechanical) because it is 90° out of phase with the voltage. However, in a real coil with electrical resistance, the mere passage of reactive current through copper coils of finite resistance does generate heat as an unavoidable consequence of magnetizing the core. Magnetizing current is therefore not only reactive, but in a resistive circuit has a real component exactly in phase with voltage indicating actual power dissipation in the form of heat in the windings.

Obviously it is advantageous to reduce core reluctance in an AC induction motor in order to minimize reactive current and its associated heat generation. An appreciable source of reluctance in an AC induction motor is the rotor-stator gap. Maintaining a minimal gap limits the reactive current for cooler operation and acceptable motor efficiency.

Common to all transformers, including the AC induction motor, is the principle of flux cancellation. The magnetizing (reactive) primary current alone represents a small fraction of the maximum current capacity of a transformer/motor. Yet this relatively low primary current is all that is required to bring the core to saturation. High current flows through a transformer only when the secondary is also conducting. Primary current then is equal to both secondary and magnetizing currents. Except for the magnetizing current, which is constant for a given flux density and primary applied voltage, the additional magnetic fields produced by both primary and secondary currents completely cancel one another leaving only the constant core field produced by the magnetizing current. Flux cancellation permits a transformer or an AC induction motor to accommodate current levels tens of times higher than the magnetizing current alone yet without saturating the core.

The typical 3-phase stator of an AC induction motor creates a rotating magnetic field diametrically traversing the rotor. The rotational rate (synchronous frequency) of this field is determined by the frequency of the 3-phase electric power supply. Rotor rotation at synchronous frequency provides no relative motion between the rotating stator field and the rotor conductors. As rotor speed drops below synchronous frequency, i.e., begins to "slip", the stator field then begins to move relative to the rotor conductors and thereby induces a voltage in the rotor circuit. The resulting rotor current produces a rotor field rotating relative to the rotor at slip frequency $W_{SLIP}$, which is the difference between synchronous and rotor frequencies. This slip frequency adds to the shaft frequency to give a total rotor frequency, as seen from a stationary frame of reference, equal to the synchronous frequency of the stator. Thus both rotor and stator magnetic fields "lock in" at the same frequency as seen from a stationary reference point.

Rotor and stator fields are angularly displaced from one another by the so-called torque angle. Ideally the torque angle should be 90° to produce the highest torque possible per unit amp-turns or per unit heat generation. In practice the torque angle in an AC induction motor is significantly greater than the optimum 90° which leads to far less torque generation than would otherwise be possible. Because there is no physical connection of the rotor electrical circuit to the outside world there is no way to influence when current flows in the rotor with respect to stator current. Coordinating both rotor and stator fields is beyond direct control inasmuch as it is governed only by the inherent electromagnetic properties (reactance and resistance) of the rotor core/conductor circuit.

Two electromagnetic properties of the rotor determine when rotor current and its resulting magnetic field occur relative to the stator field: rotor resistance and rotor reactance. Resistance is an electrical property of the rotor conductors; reactance is a function of frequency and magnetic core properties. Without reactance, rotor current could flow with correct synchronization to the stator field to produce a 90° torque angle independent of slip. The unavoidable presence of rotor reactance, however, causes rotor current to lag behind the ideal timing to produce a torque angle greater than 90°, about 160–170°, approaching 180° where torque drops to zero. Because reactance is the product of rotor inductance and slip frequency, the effects of reactance increase with slip frequency. Yet slip is essential for inducing rotor current that produces torque. But slip also causes the rotor field to lag behind the stator field which reduces torque.

Thus two conflicting phenomenon are operative simultaneously. Initially, at low slip and low reactance, torque production approaches the ideal 90° torque angle. As slip frequency increases, a point is reached where the counterproductive effects of reactance begin to dominate and torque drops off regardless of increasing slip, a situation known as pull-out, the peak torque available.

Thus the AC induction motor has a definite peak in torque production that is impossible to surmount under any condition. Peak torque of the motor is considerable, however, as much as four times the rated continuous torque. But this high torque level is sustainable only for brief periods because of low efficiency and high heat generation due to the very poor torque angle.

In order to adjust the balance of opposing effects in favor of an improved torque angle at high slip, the rotor resistance may be raised without affecting its reactance Thus higher slip may be realized before reaching peak torque. This technique of varying the rotor resistance was used in early variable speed strategies before the advent of power electronics. However, raising rotor resistance also raises rotor losses making this method of speed control very inefficient, the efficiency being approximately:

Efficiency=(1−S), where $S=W_{slip}/W_{syn}$, where $W_{slip}$=slip frequency; and $W_{syn}$=synchronous frequency FIG. 1 is a phasor diagram for a conventional AC induction motor showing the rotor and stator currents $I_{ROT}$ and $I_{STAT}$ respectively. Their large magnetic fields (not shown) cancel one another leaving only the net magnetizing current and its net field $B_{NET}$ near core saturation $B_{SAT}$ which vector is always perpendicular to $V_{STAT}$ and $V_{ROT}$ as shown in the phasor diagram. Rotor current interacts with the net field to produce rotor shaft torque and stator reaction torque. Induced rotor voltage $V_{ROT}$ is produced by stator field $B_{STAT}$ slipping around the rotor at slip frequency $W_S$. $V_{ROT}$ in turn drives rotor current $I_{ROT}$ to produce the rotor magnetic field (not shown). Both stator voltage $V_{STAT}$ and rotor voltage $V_{ROT}$ are supported by the same net magnetizing field $B_{NET}$, the former at line frequency and the latter at slip frequency. Notice that the rotor voltage $V_{ROT}$ appears as two normal components, one across the rotor winding resistance as $V_W$ and the other across the rotor reactance as $V_L$, where $V_L$ is proportional to slip frequency $W_S$ and is expressed as $V_L=I_{ROT} \times X_{ROT}=I_{ROT} W_S L_{ROT}$ where $L_{ROT}$ is the intrinsic rotor inductance. At low slip frequency, $V_L$ is very small compared to $V_W$ and torque angle θ approaches the ideal 90°. As slip frequency increases, $V_L$ becomes large with respect to $V_W$ and torque angle θ increases to values tending to reduce torque despite rising rotor current due to higher $V_{ROT}$ at increased slip. Thus a point is reached where the poor torque angle overwhelms any increase in rotor current as slip increases further, after which torque begins to decline no matter how great the slip. The frequency where torque falls off with increasing slip is known as the pull out speed and the associated peak torque is referred to as pull-out torque.

In conclusion, the AC induction motor has innate uncontrollable characteristics which ultimately prevent actualizing its full torque potential at high efficiency.

Brush-Type DC Motor:

The brush-type DC motor relies on an operating principle that does not invoke transformer action for flux cancellation. Rather, it incorporates salient (protruding) stator poles which effectively complete the stator magnetic circuit at low reluctance through the rotor while opening the rotor magnetic circuit to high reluctance through the stator. Thus with relatively little consumption of power (about 5% of total motor power), a small stator current (amp-turns) can provide a large magnetic field through which rotor conductors traverse to generate torque and rotor back EMF. On the other hand, large rotor currents produce a negligible stator field due to the high reluctance circuit offered to the rotor MMF by the salient poles. Consequently, there is negligible back EMF generated in the stator. This asymmetrical design prevents core saturation at high rotor current while permitting full flux density from low stator amp-turns.

Only a fraction of rotor copper is involved in conducting current at any particular moment, a natural consequence of attempting to reduce harmonic currents by creating a nearly ripple-free back rotor EMF that matches the DC power supply. But the penalty incurred is excessive rotor heating which limits peak torque production on a sustained basis at reasonable efficiency.

Aside from low running speed and poor utilization of rotor copper, the brush-type DC motor does indeed operate at an optimum torque angle and near the flux saturation limit. Together these two traits have imparted a reputation of extraordinarily high torque for traction applications such as in Diesel electric locomotives for example.

While excelling as a torque machine, the brush-type DC motor suffers from the electro-mechanical restrictions of mechanical brush commutation. While torque output is high, actual power and efficiency are not especially impressive due to low speed and ineffective copper utilization. Unlike the AC induction motor, brief spurts of enormous torque are available from a brush-type DC motor. There is no pull-out, no theoretical limit to the magnitude of momentary torque impulses.

Brushless DC Motor:

The brushless DC motor essentially turns the brush-type DC motor inside out by putting the "armature" on the outside (stator) while the permanent magnet (PM) rotor provides a constant DC magnetic field. Similar to the brush-type DC motor, it also operates at an optimal 90° torque angle.

Permanent magnet material has very low permeability which offers high reluctance to the stator field enabling high stator current without saturation. However, PM material has the ability to overcome its own internal reluctance to create a substantial field throughout the surrounding magnetic core. Consequently the same asymmetric magnetic conditions exist in the brushless DC motor as in a brush-type design except that no external electrical supply is necessary to produce the DC rotor field.

Permanent magnet materials are not presently available that approach the flux density of electromagnets. In fact, a flux density less than half of saturation is obtained from the best PM materials known. In addition, their temperature sensitivity renders motor applications problematic at sustained high power levels. Inasmuch as torque is the product of amp-turns and flux density, reducing flux density to half the saturation level by using PM materials requires twice the amp-turns to compensate and achieve the same torque. But twice the amp-turns results in quadrupling of heat generation per unit torque as compared to the present invention or brush-type DC motor.

Off-setting this torque deficit, as compared to the brush-type machine, the brushless DC motor is capable of very high rotational speeds so that its actual power may exceed that of a brush-type motor. Furthermore, the brushless motor is similar to brush-types inasmuch as very high momentary torque impulses are possible without pull-out.

SUMMARY OF THE INVENTION

The electric motor of the present invention shares features with the brushless DC motor in every respect with one critical exception: the usual permanent magnet rotor is replaced with an electromagnetic wound rotor. Even with the most advance PM (Permanent Magnet) neodymium "super magnet" material, flux density within the brushless DC motor is only half the flux capacity of iron rather than near saturation as achieved by the motor of the present invention which effectively doubles iron utilization.

Maximum flux density in the motor of the present invention allows doubling of torque per unit of heat generation relative to a brushless DC motor. In other words, torque may be produced with less than a fourth of the energy losses. Power density is over twice as great for a given heat dissipation with a corresponding increase in motor efficiency.

PM materials are very heat sensitive and permanently loose their magnetization above a critical temperature of around 300–400° F. Permanent magnets are far more costly compared to the copper-iron rotor used in the motor of the present invention. Furthermore, difficulty in handling bulk quantities of PM material makes fabrication of larger brushless DC motor sizes impracticable.

Brush-Type DC Motor:

The motor of the present invention also has features common to the DC motor. Both operate at full flux density and 90° torque angle. The most obvious difference is elimination of mechanical commutation (brushes and commutator) which enables the motor of the present invention to run many times faster with a commensurate increase in shaft power. Unlike the brush-type DC motor, the rotor-stator gap is uniform without salient poles thereby eliminating flux distortion and the necessity of corrective inter-poles. Moreover, total armature copper is continuously excited for greater efficiency than a standard brush-type DC motor where only partial copper is available for toque production at any instant.

AC Induction Motor:

Comparing the motor of the present invention with various other motor concepts, the greatest contrast exists with the AC induction motor, the most prevalent of all motor types. This workhorse of industry would be an ideal machine except for its poor torque angle of 160–170° which prevents efficient operation at full load. Conversely, the motor of the present invention always operates efficiently at the ideal 90° torque angle yielding a three-fold boost in torque density (torque per pound of motor weight) irrespective of load conditions.

A relatively large rotor-stator gap is employed in the motor of the present invention to prevent core saturation at the current (amp-turns) levels required for useful torque production. The air gap may be increased 10–20 times over that typically found in a standard AC induction motor.

The stator is of conventional 3-phase design operating in conjunction with a single-phase wound rotor where both stator (effective) and rotor have the same amp turns and flux density. Rotor and stator both also have the same number of poles. Aside from the enlarged air gap, the motor is manufactured using standard construction practices developed over the past 100 years.

Capable of full flux density at high rpm, along with an ideal 90° torque angle, no conceivable motor can produce more torque more efficiently The design of the motor of the present invention advances motor technology to the ultimate theoretical limits established by the laws of physics.

BRIEF DESCRIPTION OF THE DRAWINGS

These, as well as other features of the present invention, will become more apparent upon reference to the drawings wherein:

FIG. 1 is a phasor diagram for a conventional AC induction motor;

FIG. 2 is a diagram illustrating the torque production per phase for the motor of the present invention;

FIG. 6 is a circuit diagram for a generator of the present invention;

FIG. 7 is a graph illustrating the current for the generator of the present invention;

DETAILED DESCRIPTION

Motor Operation

Figure 3:
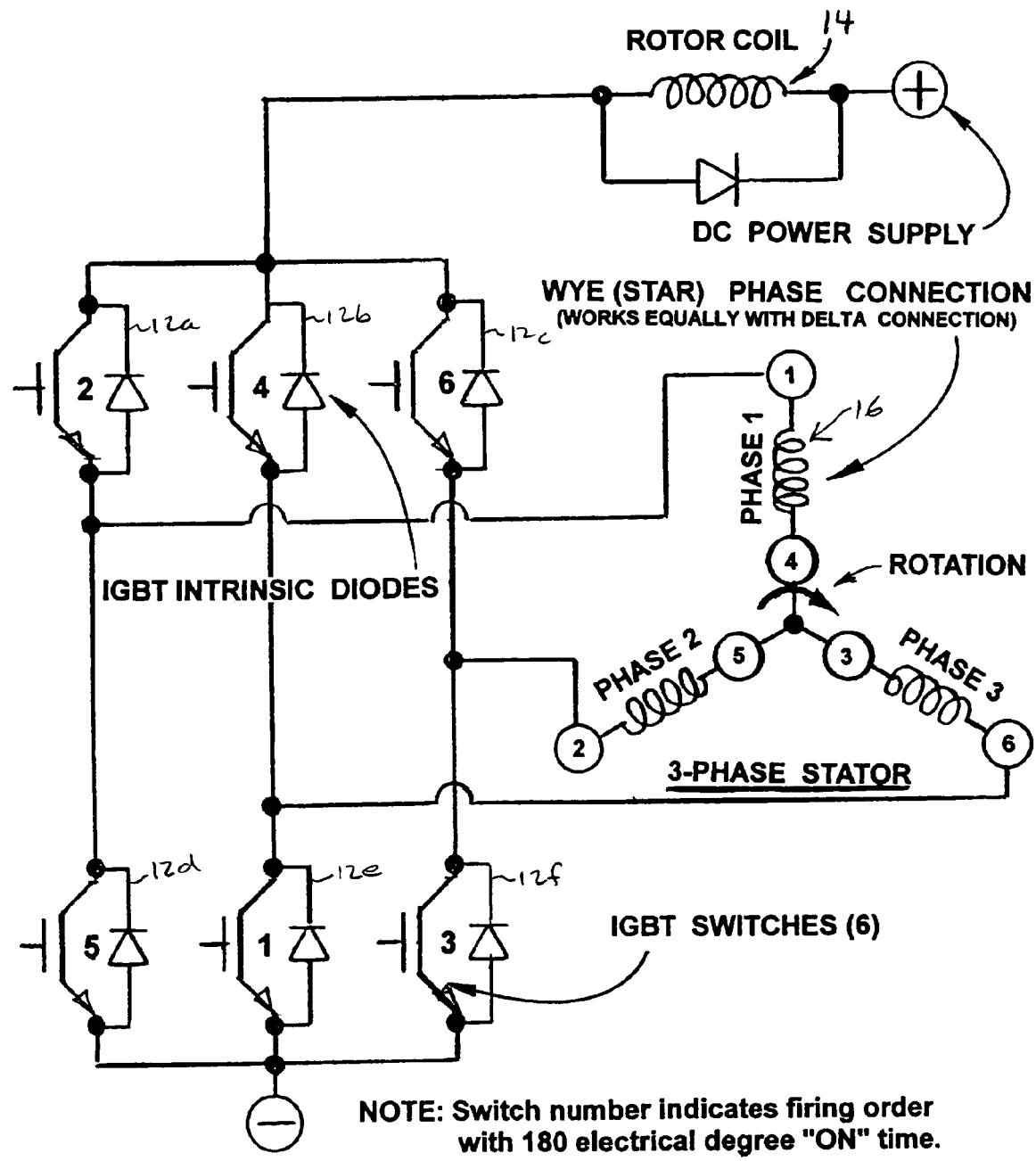
FIG. 3 is a circuit diagram for the motor of the present invention.

Electromagnetic Symmetry:

Referring to FIG. 2, the rotor and stator in the motor 10 of the present invention are not linked solely magnetically as in the transformer model of the AC induction motor. Instead, the wound rotor coil and stator coil are connected electrically in series which assures precise coordination of their magnetic fields relative to one another at a 90° torque angle.

The motor 10 incorporates a rotor and stator that are electromagnetically identical. Each has the same amp-turns and magnetic circuit reluctance Connected in series, they both produce fields of equal magnitude at controlled angular alignment so that peak magnetic fields are synchronized at an orientation of 90°. Optimum torque angle of 90° is thereby maintained under all operating conditions of speed and torque. With the same amp-turns and same magnetic field, it is impossible to distinguish rotor from stator except that one rotates and the other is stationary.

Enlarged Air Gap:

Prevention of core saturation in the design of the motor 10 does not depend on flux cancellation (AC induction motor) nor magnetic asymmetry (brush-type DC motor) nor high reluctance PM material (brushless DC motor) as found in the prior art. Rather, a rotor-stator air gap 10–20 times larger than traditional practice increases magnetic circuit reluctance to permit high rotor-stator current without incurring saturation. The amp-turns of the motor 10 are comparable to any conventional motor and produce the requisite magnetic field while generating torque at levels at least three times higher for the same resistive copper losses due to the 90° torque angle and full flux density.

Back EMF:

All power conversion devices, such as electric motors that convert electrical power to mechanical power, must have some mechanism for creating a reverse voltage (back EMF) against which current flows. Back EMF is analogous to a voltage drop across a resistor wherein electrical power is converted to thermal power. In rotating electrical machinery this mechanism always appears as a change in the total flux penetrating the armature coil. A changing magnetic field induces a voltage by electromagnetic induction which opposes the change in current. This opposing voltage in an electric motor is termed back EMF.

Dynamic Resistance $R_D$:

Back EMF in the motor 10 is unique in that it is a function of rotor-stator current and thus obeys Ohm's Law. Correctly stated, the back EMF is simply the voltage drop across a back resistance or dynamic resistance $R_D$. In turn, dynamic resistance $R_D$ is a function of motor geometry, winding turns and shaft rotational speed. Current flowing through $R_D$ produces mechanical power rather than thermal power as in the case of a static resistor.

Viewing it from a different perspective, a given current flowing through both rotor and stator produces a net magnetic field which varies in magnitude according to the angular orientation of rotor and stator coils. This changing magnetic field induces equal true back EMF voltages in both rotor and stator, the sum of which is the total back EMF of the machine. Yet, because rotor and stator magnetic fields are themselves functions of current, then total machine back EMF must also be a function of current, i.e., a voltage drop. At the most fundamental level, the machine creates back resistance or dynamic resistance $R_D$ through which current flows to produce mechanical power.

In other words, the rotor individually produces a conventional back EMF due to the rotor field. The stator also produces a true back EMF due to the rotor field. Because each back EMF arises from the field of the other and the fields are in turn functions of current, the combined rotor-stator EMF is a function of current thereby imparting the unusual characteristic of back resistance to the overall machine.

Figure 4:
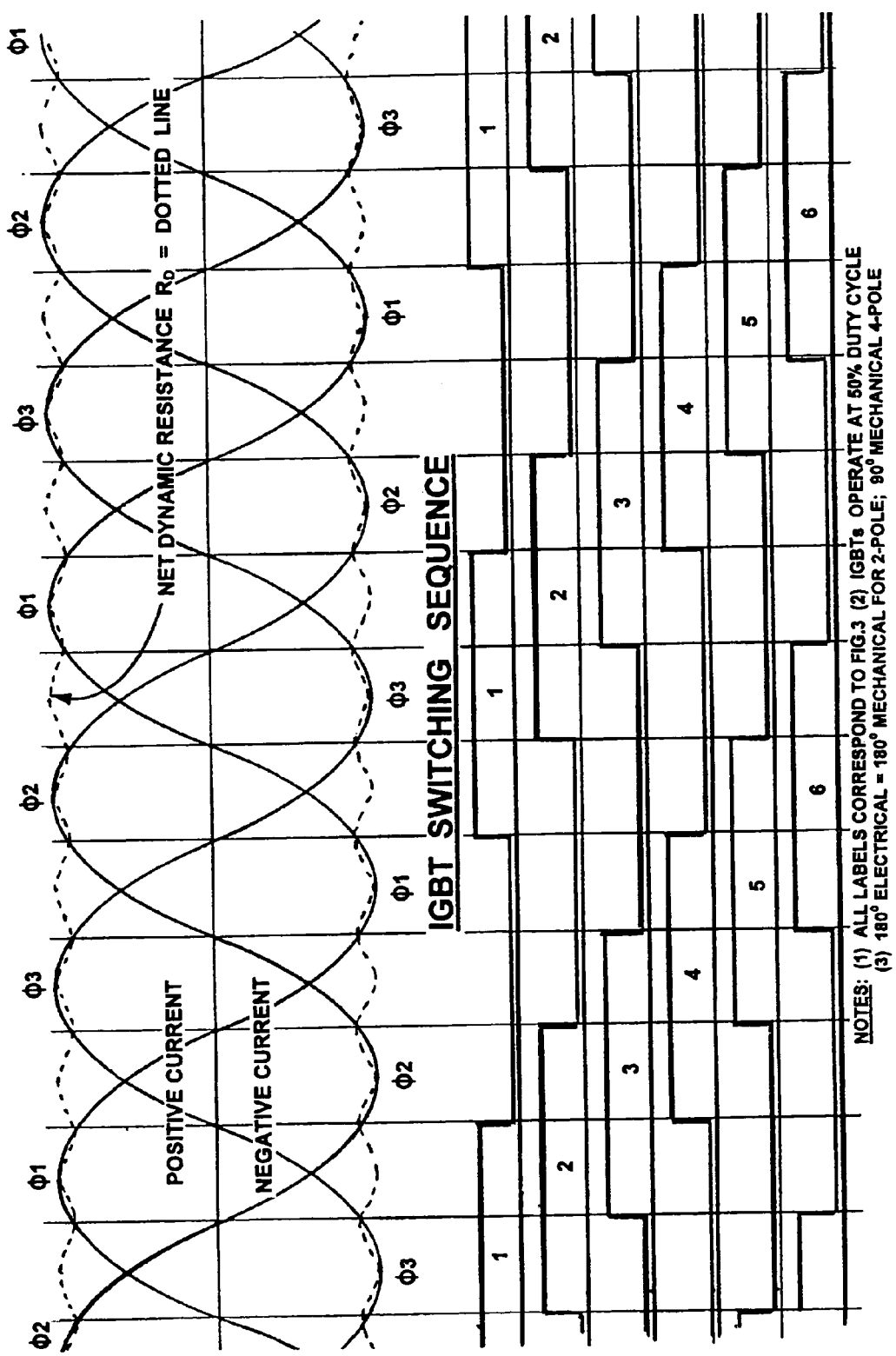
FIG. 4 is a graph illustrating dynamic resistance and switching sequence for the motor of the present invention.

FIG. 4 shows the Phase Dynamic Resistance $R_D$ of all three phases overlapping one another, each phase producing a sinusoidally-varying value of $R_D$. Constant current flowing through any particular phase would create a corresponding sinusoidal back EMF which would translate to a sinusoidal voltage drop. Current is applied to a phase only in the vicinity of plus-or-minus 30° of the optimum 90° torque angle where $R_D$ is near maximum in order to extract as much mechanical power as possible from the current relative to heat generation in the windings. Phase current reverses direction every half-cycle which causes the direction of voltage drop across $R_D$ to reverse cyclically. Thus the dynamic resistance in FIG. 4 is depicted as a waveform of alternating polarity although actual resistance has no directional properties.

Interestingly the mathematical expression for $R_D$ is precisely that of the inductive reactance of the motor, namely, $R_D = wL$ where w is the angular frequency and L is motor inductance. This should not be too surprising considering the back EMF (voltage drop across $R_D$) is a totally electromagnetic phenomenon and the relevant mechanism would be expected to comprise only electromagnetic principles rather than resistive elements of any kind. Accordingly motor power may be expressed as $P=I^2wL$. It must be emphasized that this is not reactive power as would be the case if the shaft were locked and a frequency w applied to the motor. Instead, it is real shaft power when shaft rotation is synchronous with the applied frequency.

The expression $P=I^2wL$ seems to indicate motor power P is proportional to inductance L. Conversely, for fixed turns, motor power decreases with an increase in L because, at saturation, current I is inversely proportional to L. Thus when the variation of I with respect to L is taken into account, power P increases with a decrease of inductance L. The relationship of motor power to inductance is more clearly presented as $P=\theta^2 \Re w$ where $\theta$ is total motor flux and $\Re$ is motor reluctance. At constant flux $\theta$, motor power actually increases with an increase in magnetic circuit reluctance $\Re$ which, at fixed turns, increases with a decrease of inductance L.

Inductive Properties:

The motor 10 also possesses inductive properties inasmuch a varying current (varying magnetic field) at any coil angle also self-induces a voltage in the rotor and stator coils. But this reactive voltage is 90° out of phase with the current and cannot be classified as true back EMF in terms of shaft power. It is simply inductive reactance contributing to the overall impedance of the machine. Only a varying angular position of rotor with respect to stator, i.e., shaft rotation, will induce a voltage that is in-phase with the current and represents production of mechanical power.

Due to the large rotor-stator gap, the motor 10 is a so-called gapped structure representative of a true inductor capable of storing a large amount of magnetic energy within the gap volume.

Torque Production:

As mentioned, net magnetic field and rotor-stator currents interacting together are created by the same amp-turns in both the rotor and stator. Current in the rotor interacts with the stator field to produce shaft torque and, similarly, stator current interacts with the rotor field to produce stator reaction torque. The two processes can be differentiated mechanically but not electrically or magnetically.

Torque T is generated as a function of current I interacting with magnetic field B according to: $T=kIB$, where k is a proportionality constant. Since current in the motor 10 produces both the field and is also the torque-producing current, torque T is therefore a function of the square of current, or $T=kI^2$.

Motor Power:

Mentioned previously, torque is proportional to current squared so that shaft power must also be proportional to current squared but multiplied by a resistive term that is also a function of shaft speed. This resistive term, is, in fact, the dynamic resistance $R_D$ described above, Therefore dynamic shaft power $P_D=I^2R_D$.

Motor Efficiency:

Dynamic resistance $R_D$ is analogous to static winding resistance $R_W$ inasmuch as both types of resistance produce power, one as shaft power, the other as winding heat power $P_W=I^2R_W$. The ratio of winding power (heat) to dynamic (shaft) power gives $R_W/R_D$ which is the only variable in the equation of motor efficiency, ignoring such minor losses as core hysteresis, windage and bearing drag.

Basic motor efficiency EFF is given as: $E_{FF}=1/(1+R_W/R_D)$. Clearly, the highest possible value of $R_D$ is desirable for achieving maximum efficiency. And because $R_D$ is directly proportional to rotor frequency, motor efficiency improves with shaft speed (frequency) as prevails in every electromagnetic device including motors and generators.

Current—Voltage Waveforms:

As mentioned above, heat production due to ohmic loss in the rotor-stator windings is a function of current squared. The ratio of heat loss to torque remains constant and independent of current because the $I^2$ term cancels out of this ratio. Thus there is no necessity of maintaining a prescribed current waveform by PWM methods since current at any level within the saturation limit has no effect on motor efficiency. Both heat and torque vary by the same proportion with a change in current. Consequently, PWM sinewave synthesis is not required to control heat-producing harmonic currents that would otherwise plague a conventional machine with low efficiency. While harmonic currents (non-sinusoidal components) do exist in the motor 10, they produce torque in the same constant proportion as they produce heat according to the ratio $R_W/R_D$ which is the relevant term in the efficiency equation. (see "Motor Efficiency" above)

Efficiency is nearly immune to harmonic (non-sinusoidal) currents so long as they are concentrated mostly within 30° of the optimum 90° torque angle.

Pulse Width Modulation (PWM):

As explained above, for the purpose of sinewave synthesis, Pulse Width Modulation (PWM) is not required for efficient performance of the motor 10. Accordingly, the high frequency carrier signal and switching losses attendant to sinewave synthesis are eliminated.

Variable Voltage Control:

The motor appears as a large mechanical resistor whose resistance $R_D$ is directly proportional to shaft speed. The mechanical (dynamic) power may be expressed as: $P_D=I^2R_D$, as given above (see "Motor Power" section). Invoking Ohm's Law, shaft power can also be expressed as $P_D=V_A^2/R_D$, where $V_A$ is the applied terminal voltage. Thus motor power, speed and torque, can only be controlled by adjusting the applied voltage $V_A$.

Rather than utilizing an externally controlled voltage source, such as a switched mode power supply, the inductor nature of the motor (gapped structure), in conjunction with the existing phase switches, offers a self-contained means of governing the effective applied voltage $V_A$ from a fixed-voltage DC source such as batteries. Variable duty-cycle voltage control may run at frequencies 10–20 times lower than PWM frequencies used for sinewave synthesis since exact waveform replication is not critical to efficient motor operation. Switching losses associated with high switching repetition rates are thereby reduced considerably.

Effects of Phases on $R_D$:

Dynamic resistance $R_D$ is also a function of the angle through which the rotor field rotates from one stator phase to the next. Thus increasing the number of phases improves phase overlap and concentrates application of stator current around a 90° torque angle. Thus rotor traversal across a phase is within plus or minus 30° of the optimum torque allowing $R_D$ to approximate a constant peak value.

The motor 10 with a 3-phase stator will produce a dynamic resistance $R_D$ with a ripple of plus or minus 7%, or an average value of about 93% of the peak value. Thus the ratio $R_W/R_D$ as used in the efficiency equation will fluctuate only slightly during an electrical cycle so that efficiency stays nearly constant regardless of current amplitude within the sub-saturation range.

Gap Volume:

Torque for the motor 10 is shown mathematically to be directly proportional to the magnetic energy stored in the rotor-stator air gap volume. Stored magnetic energy $E_M$ is proportional to the product of gap volume $V_{OL}$ and the square of flux density B so that: $E_M=kV_{OL}B^2$. Therefore gap volume is a critical parameter in motor performance below the saturation level.

Gap volume V may be varied by either changing the rotor-stator axial length, which increases machine weight, or by increasing the radial dimension of the gap which has no effect on weight. Increasing axial length at constant diameter results in an increase in both dynamic resistance $R_D$ and winding resistance $R_W$ so that this ratio remains constant and efficiency $E_{FF}$ is unaffected while torque is increased, assuming a constant radial gap. In other words, torque is proportional to machine length as would be expected, all else being equal.

However, if rotor length and rotor diameter are held constant and only the gap radial dimension is increased, then torque will also increase but at the penalty of increased winding $I^2R_W$ because higher current (amp-turns or MMF) is required to produce the same flux density B which is directly proportional to current I while losses are proportional to $I^2$. Thus heat loss will outstrip gain in torque which lowers overall efficiency. This effect may also be seen as a reduction of dynamic resistance $R_D$ which is inversely proportional to radial gap length. Thus the ratio $R_W/R_D$ is raised with an enlarged gap which lowers motor efficiency $E_{FF}$.

At a constant axial dimension, the radial gap may be increased without adversely affecting efficiency only by increasing rotor diameter in the same proportion which effectively results in an increase in gap volume. Keeping the ratio of gap to rotor diameter constant allows for an increase in torque at constant efficiency but incurring a gain in motor weight in the same manner as increasing axial length at constant diameter.

Motor Size:

There is a tradeoff between motor torque and motor efficiency for a motor of given size. Motor torque is gained only at the expense of efficiency if total motor weight is held constant. The only way torque can be increased without impacting efficiency is to increase motor size/weight, a property of all motors.

Power Density:

It can be shown theoretically that motor power at fixed efficiency varies as the $5^{th}$ power of motor size while motor weight (volume) varies according to the $3^{rd}$ power. Thus power density increases as the square of motor size with the stipulation that efficiency is held constant, a property common to all electro-mechanical devices.

For a given torque, the only other way to raise power density is to increase shaft speed, a technique common to all motors. However, if a maximum ceiling is placed on shaft speed, there is no other alternative for raising power density for a given size than to increase torque, an approach only available with the motor 10.

Variable Phase Timing:

In conventional motors with true back EMF, such as brushless and brush-type DC motors, motor current is driven by the difference between applied terminal voltage and the internally-generated back EMF. For any given current this voltage difference is independent of speed. Inherent inductance of the motor circuit, also independent of speed, establishes a fixed delay in the time required for current to rise within each phase. As speed increases, application of terminal voltage must be advanced to compensate for the fixed current rise time so that peak phase current will occur at the optimum 90° phase angle. Thus variable phase timing is necessary to maintain optimal performance throughout a wide speed range.

The motor 10 does not have true back EMF, but rather a voltage drop across dynamic resistance $R_D$ where $R_D$ is proportional to speed. For any given current the absolute applied voltage appears first across the motor inductance when a switch turns on. In cases where the absolute applied voltage is speed-dependent at constant current, obeying Ohm's Law, the current rise time due to inductance decreases with increasing speed rendering a constant ratio of current rise time to cycle time throughout the speed range without requiring variable phase timing.

In cases where applied voltage is constant with current regulated by variable duty-cycle switching as described in the section Variable Voltage Control, some adjustability of switch timing may be advantageous.

Above saturation (see Saturation Mode section below), the motor 10 will continue running fine but now at constant flux density where dynamic resistance is replaced with conventional back EMF. This condition would then require variable phase advance as in prior-art motors possessing true back EMF.

Snubber Network:

No snubber network is required for dissipating inductive energy at switch turn-off. Magnetic energy in a gapped structure is stored almost entirely within the gap as a function of the gap volume multiplied by flux density squared, i.e., $E_M = kV_{OL}B^2$ as given above under the Gap Volume section. Torque is directly proportional to the stored magnetic energy $E_M$ in the sub-saturation mode of operation. Therefore a large quantity of energy must be either dissipated or returned to the DC source following the turn-off of each phase coil. The dissipation approach would require an elaborate and energy-lossy snubber network.

A far easier and efficient method is to use anti-parallel diodes across each switch and one diode in parallel with the rotor coil for returning most of the gap energy to the power source. A total of 7 diodes of relatively low power rating would be sufficient to recycle the magnetic energy. Where IGBTs (Insulated Gate Bi-polar Transistor) are used, their intrinsic diode fulfills this task without additional hardware except for the single rotor coil diode (see FIG. 3).

Inductance offered by the rotor coils reduces the turn-on switching losses even with comparatively slow turn-on times. This favorable situation does not exist during turn-off where the large amount of stored gap energy demands rapid turn-off in order to minimize switching losses. An alternate current route returning to the DC source must be made available to avoid high voltage inductive spikes across the switches. This energy detour is provided by anti-parallel diodes which effectively clamp all inductive voltage spikes to the DC bus voltage.

However, with extremely fast turn-off, the self-inductance of even short lengths of wire connecting switches to the DC bus may offer sufficient impedance to the reactive current as to create very brief but potentially damaging high voltage spikes across the switches. A small auxiliary snubber capacitor mounted in close proximity to the switches will momentarily absorb a portion of the total recovery energy to allow time for the reactive current to rise to full value while returning to the DC source.

In summary, with proper circuit design, inductive spikes may be eliminated without incorporating a large snubber network by simply using diodes to salvage the inductive energy contained within the motor's rotor-stator gap.

Poly-Phase Stator Winding:

The 3-phase stator format achieves good motor efficiency with a reasonable number of solid-state switches. Marginal improvement in efficiency resulting from a higher number of phases and their corresponding switches does not justify the additional hardware expense and complexity. The standard six-switch (three half-bridges) electrical topology is thus presented as the preferred embodiment of the invention.

Two-On VS. Three-On Switching Mode:

At any given instant there must be at least two switches out of the six turned on simultaneously but no more than three switches out of the six simultaneously on. The choice between 2-on versus 3-on is dictated by efficiency considerations. Analysis reveals that 3-on provides somewhat more torque per unit heat generation than 2-on only when the phases are delta connected. No difference exists between 2-on and 3-on in the wye connection.

Wye Vs Delta Connection:

Theoretical examination indicates no difference in torque per unit heat generation between wye and delta connections in the 3-on switching mode. However, in a 2-on switching system the wye connection gives 1.125 times more torque per unit heat generation than a delta connection.

In short, either wye or delta may be used interchangeably in a 3-on switching format but the wye connection is slightly more efficient when used in a 2-on switching system A motor 10 designed to run at high speed and low voltage may call for a number of winding turns less than unity in a wye connection Once the one-turn limit in the wye connection has been reached, there is no other alternative than to use a delta connection which allows a speed increase of 73%, all else being equal for a 3-on switching mode Rotor Turns:

Torque magnitude in the motor 10 is a function of the square of flux density, i.e. $B^2$, as is also heat generation in the windings. Thus the ratio of torque-to-heat is independent of current as discussed above. For given amp-turns using a fixed bulk of copper volume, both torque ($B^2$) and winding resistance are functions of the square of the number of winding turns. Thus turns N also cancel from the ratio of torque-to-heat generation. In brief, amp-turns has no effect on the torque-to-heat ratio and thus no effect on motor efficiency. As a result the number of rotor turns may be adjusted to whatever value is necessary to create a rotor field equivalent to the net stator field without adversely affecting the torque-to-heat ratio.

The following ratios of rotor turns $N_R$ to stator turns $N_S$ should be observed under the stated conditions to assure equal values of rotor and stator fields where $N_S$ is always the per-phase value.

| | | |
|---|---|---|
| WYE CONNECTION: | For 2-on, $N_R = (1.732)N_s$ | For 3-on, $N_R = (1.5)N_s$ |
| DELTA CONNECTION: | For 2-on, $N_R = (1.0)N_s$ | For 3-on, $N_R = (.866)N_s$ |

Saturation Operating Mode:

Above saturation flux density is constant despite increasing rotor-stator current. Under this scenario torque continues to increase directly proportional to current, i.e., $T=kIB_{SAT}$. Thus resistive $I^2R_W$ losses outpace torque and efficiency begins to degrade as current rises above saturation. Nevertheless, large torque impulses of short duration, limited only by overheating, are possible just as in brush-type and brushless DC motors but not possible in an AC induction motor due to the pullout torque limit.

As stated, the motor 10 runs satisfactorily above core saturation with the characteristics of a brushless or brush-type DC motor. However, since the magnetic field is constant above saturation, no longer being a function of rotor-stator current, then the dynamic resistance $R_D$ disappears and is replaced with true back EMF as in a conventional motor. Consequently PWM sinewave synthesis becomes necessary unless a trapezoidal back EMF could somehow be designed into the machine.

Variable timing advance becomes necessary above saturation since the motor exhibits true back EMF.

Saturation-mode operation may be implemented at low power levels by reducing the rotor-stator gap to the conventional running clearance. Under this scenario there would be no sacrifice in maximum motor power as compared to the wide-gap sub-saturation mode described above. And theoretically it would be more efficient at part-load because flux density would be mostly at maximum (saturation) value except at the very lowest power level. Again, this mode is sensitive to harmonic currents that can only be mitigated by PWM or trapezoidal designs and variable gate timing would be required.

Generation of Torque:

FIG. 2 is a schematic portrayal of rotor and stator (one stator phase shown) coils and their respective magnetic fields aligned at the optimum 90° torque angle. Note that rotor and stator coils are electrically connected in series. Shaft torque is produced by the tendency of two magnetic fields (rotor and stator in this case) to seek parallel alignment which reaches maximum torque effect when they are perpendicular to one another.

A rigorous mathematical evaluation of torque development, however, is not based on the absolute magnitudes rotor and stator fields interacting with one another, but rather the amp-turns of the rotor traversing the stator magnetic field. This is the approach generally applied in motor theory where the field magnitudes of rotor and stator may be very different in conventional motors. Rotor and stator amp-turns and the resulting magnetic fields in the motor 10 are identical so that it would be just as correct to model torque in terms of stator amp-turns traversing the rotor field.

Electrical Topology:

FIG. 3 depicts the electrical power circuit of the electronic drive system for the motor 10. Six solid-state power switches 12a–12f, typically IGBTs (Insulated Gate Bipolar Transistor) arranged as three half bridges, connect to the three motor phases in the same manner as any conventional 3-phase motor drive. However, connection of the wound rotor 14 in series with the three phases constitutes a unique electrical distinction of the motor 10.

The 3-phase stator 16 shown in FIG. 3 is connected in a wye phase configuration although a delta' connection is equally effective except with a 2-on switching format for reasons explained above (see Two-on vs. Three-on Switching Mode section above).

Switching Sequence:

The switch labels (numbers 1–6) shown in FIG. 3 also represent the switching sequence with the understanding that at any instant at least two switches are turned on at the same time. The most universal gate driver would employ a 3-on format which would work equally well for either wye or delta phase connections.

FIG. 4 illustrates the IGBT Switching Sequence, or firing order for a 3-on switching mode gate driver. At any instant there are exactly three switches turned on, each switch operating at 50% duty cycle spanning 180° (electrical degrees). There is no circumstance where less than, or more than, three switches are conducting simultaneously in the 3-on mode. Gate numbers in FIG. 4 correspond to switch numbers in FIG. 3. Notice that the IGBT Switching Sequence of FIG. 4 is aligned with the Phase Dynamic Resistance $R_D$ to show how phase excitation coincides with the maximum cumulative resistance $R_D$ of all three phases for a particular rotor position.

Rotating Magnetic Field:

Operation of all electric motors, including the motor 10, is based upon a universal principle: a rotating magnetic field in one member attempts to lock-on to the fixed field in another member. Thus all motors have two fields: a field that is stationary relative to one member (rotor or stator) and another field that rotates relative to the complementary member (stator or rotor). One apparent exception is the case of an AC induction motor where the rotor field "slips" slightly with respect to the mechanical rotor in order to generate its own field, but even here the rotor field is locked-on to the stator field. The slight slippage of the rotor field around the rotor may be ignored and considered essentially attached to the rotor.

At least two phases are necessary to impart a sense of directionality for production of unidirectional torque. The single-phase AC induction motor is a seeming exception but in fact the non-directional oscillating field may be considered the resultant of two counter-rotating fields that produce equal but opposing counter-torques upon the rotor at stall. Thus the 1-phase AC motor has zero starting torque and requires auxiliary starting windings. Approaching synchronous speed in either direction, the counter-torques become imbalanced such that the torque difference drives the motor.

Figure 5:
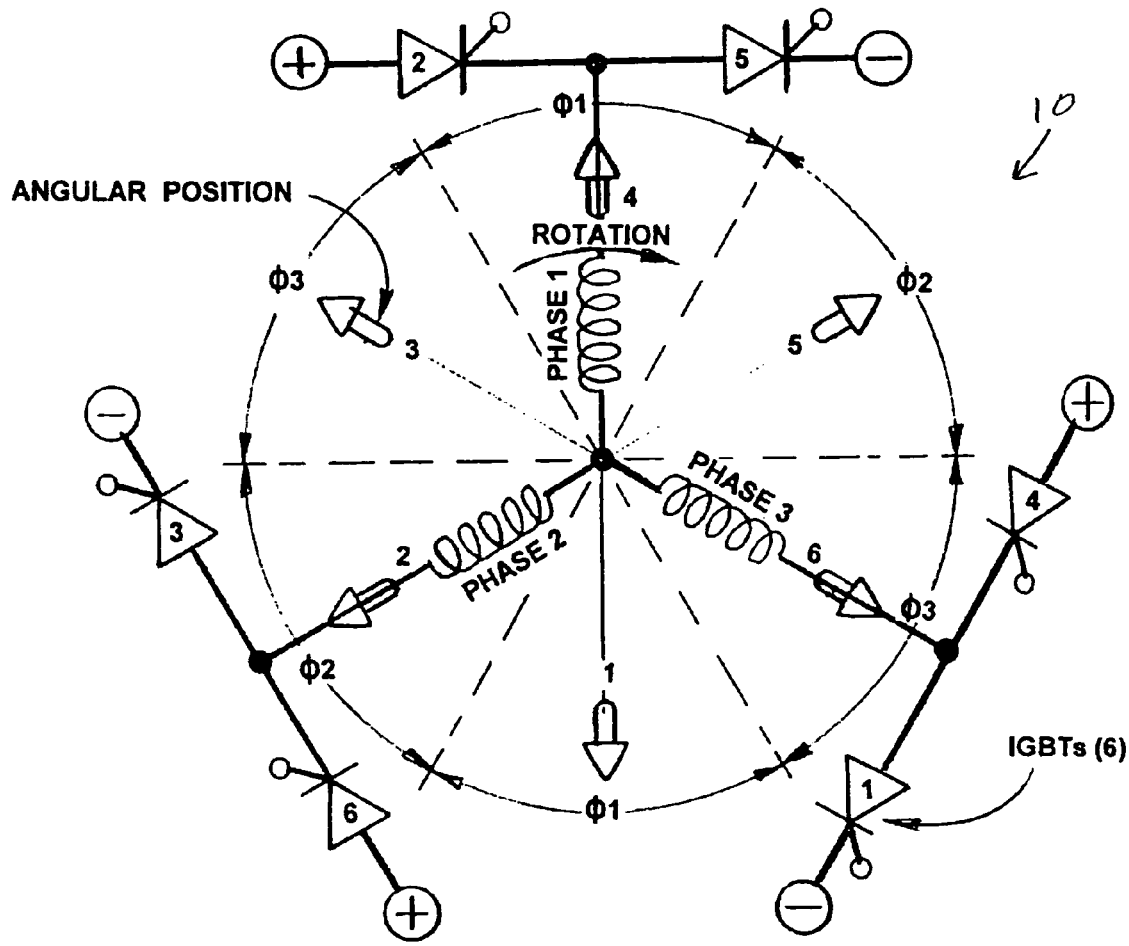
FIG. 5 is a diagram illustrating the phase excitation sequence for the motor of the present invention.

The motor 10 requires at least two phases but three phases represent the preferred embodiment for reasons given above. (see Poly-Phase Stator Winding section). Considering hereafter only a 3-phase format, each phase, in cooperation with the other two phases, produces a stator magnetic field of shifting angular orientation in six discrete 60° increments per 360° electrical cycle. The step-wise angular progression of the stator field is shown in FIG. 5 for clockwise shaft rotation. During actual operation phase energy is partially transferred from one incremental phase position to the next as to create a nearly step-less and uniform rotation of the magnetic field.

In FIG. 5, each of the 60° angular positions is labeled 1 thru 6 in a clockwise direction starting with the first increment located in the 6-o'clock position. To create the field at this orientation, full current flows into phase-1 and then splits at the wye connection into phases 2 and 3 with each receiving half of the current of phase-1. Vector components of all three magnetic fields produce a resultant field in the direction of position-1 (6-o'clock) of a net magnitude 1.5 times the field produced by phase-1 alone.

The truth table shown in FIG. 5 indicates switches 1, 2, 3 are turned on in order to create a field aligned with position-1. For clockwise rotation the next switching sequence will turn off switch-1 and turn on switch-4 while switch-3 remains on. Now the magnetic field shifts 60° to position-2. Note that the chief phases through which total current flows are sequenced in a direction counter to the direction of shaft rotation. In this discussion it was seen that chief phase-2 followed chief phase-1 counter-clockwise. The physical arrangement of these phases would suggest counter-clockwise shaft rotation. This counter-intuitive situation is common to all 3-phase machines.

Phase-3 becomes the next chief phase carrying full current in position-3. Then in position-4 (12-o'clock position) phase-1 again becomes the chief phase only this time full current flows out through switch-5 in the opposite direction of position-1 when full current flowed into phase-1 through switch-2. Thus for every 180° electrical cycle the direction of current will reverse in each phase. The next two positions, position-5 and position-6, again involve phases 2 and 3 respectively as chief phases advancing in a counter-clockwise sequence before returning to phase-1 at position-1.

Generator Operation:

Any motor is inherently a generator, the difference being simply the direction in which power flows through the electro-mechanical device. Thus all the principles and features discussed above apply generally to the generator mode of operation.

Self-Excitation:

During motoring, the applied voltage drives a current through the machine which supplies the field excitation of inducement of back EMF in rotor and stator. For generating, the excitation current must be supplied by the generator itself. Initially, before generation begins, no such excitation current exists which prevents generation of the excitation current necessary to sustain generation. Thus an auxiliary starter current is required to initiate generation after which generated current will maintain operation by self-excitation without involving the auxiliary supply as long as machine current remains above the minimum threshold current.

Circuit Layout:

FIG. 6 shows the complete power circuit for a DC generator 20 constructed in accordance with the present invention. Notice that the three half-bridge switches of the motor have been replaced by three half-bridge diodes 22a–22c. Thus, typical of most motors and generators, the active switching devices required of a motor are substituted with passive diodes for a generator. One switch (IGBT) 24 shown in FIG. 6 is used for current control as will be described below.

Note in FIG. 6 the imposition of an auxiliary starter DC power supply 26 and switch S1 for starting purposes only. Once generation begins, with current never dropping below the maintenance threshold, switch S1 may be opened permitting the auxiliary power supply 26 to drop out of the circuit. Diode D1 assures starter current flows through the machine in the proper direction.

Negative Dynamic Resistance $-R_D$:

Dynamic resistance $R_D$ as treated above creates a voltage drop in the motor mode in the same fashion as an ordinary passive ohmic resistor where the only difference is production of shaft power rather than thermal power. In the generator mode the algebraic sign of $R_D$ reverses such that the passage of current creates a voltage rise across $R_D$ rather than the familiar voltage drop of the motor. Accordingly, current flowing through $R_D$ in the generator mode produces a forward EMF instead of a back EMF. Unlike conventional generators, this forward EMF is proportional current exactly as the back EMF was a function of current except that the sign of $R_D$ is now reversed to give a voltage rise instead of a voltage drop. So Ohm's Law still is still applicable but with a negative sign.

The inverted behavior of $R_D$ is intrinsically unstable inasmuch as an increasing current produces an increase in forward voltage which in turn raises current higher leading to a further increase of voltage This self-exciting phenomenon quickly escalates into a runaway current avalanche that must be interrupted before reaching saturation.

Generating Principle:

Generation begins with IGBT 24 of FIG. 6 turned on to provide a low resistance short circuit back through the generator during which time the forward generator voltage is applied to the generator itself as an inherent inductor to build up the magnetic field within the rotor-stator gap. In this manner magnetic energy is stored in the gap while the IGBT 24 is turned on. Upon IGBT 24 turn-off, the forward voltage now comes into opposition with the DC load voltage which may be in the form of a battery 28 as shown in FIG. 6. Normal operation requires the DC load voltage to exceed the generator forward voltage produced by $R_D$ so that generator current decays while releasing the stored gap energy into the load. Energy is thereby transferred under controlled conditions from the generator 20 to the load.

Critical Current:

During the on period of the IGBT 24, current may rise to a level where the generator voltage of $R_D$ is greater than the load voltage such that current will not decay but instead continue to increase in the unstable fashion until reaching saturation. The current at which generator voltage equals load voltage at the point of instability is termed the critical current. Current levels above critical can lead to a runaway condition. Thus normal generator operation must always proceed at a maximum current below the critical value.

Because generator voltage is a function of the product of shaft speed and current, the critical current level for a particular load voltage will decrease as shaft speed increases. Similarly, the minimum threshold current necessary to maintain generation also decreases as shaft speed increases.

Critical Speed:

The concept of critical current applies only to a load of fixed voltage such when charging a battery. In the case of a resistive load where load voltage is proportional to current, there is a shaft speed at which generator voltage is equal to load voltage at any current level. Under this scenario, the generator 20 will become unstable regardless of the absolute magnitude of current resulting in a runaway current avalanche. Onset of instability with a resistive load occurs at a particular shaft speed known as the critical speed that is directly proportional to load resistance. If a critical speed condition exists, the only remedy is to increase load resistance to give a theoretical critical speed above the actual generator shaft speed.

Current Control:

A current sensor 30 depicted in FIG. 6 monitors generator current. Two current set-points shown in FIG. 7 ($I_2$=critical; $I_1$=maintenance) may be adjusted according to shaft speed to give a desired average $I_{AVE}$ proportional to the actual load current Intrinsic Voltage Booster:

A feature unique to the generator 20 is the capability to automatically boost generator voltage to any voltage determined by the load without magnetic hardware external to the generator. Inherent voltage boost is attributable to the large rotor-stator gap which endows the generator with inductor properties in addition to voltage generation arising from $R_D$. The system follows a two-step process: 1) generated power charges the inductor comprising the generator itself as the gap is filled with magnetic flux; 2) The generator/inductor then discharges the gap energy at whatever voltage is required to drive current into the load.

The two steps are portrayed in FIG. 7. Current $I_1$ is above the maintenance threshold and rises exponentially to $I_2$ when the IGBT 24 is turned on to charge the inductor with flux. When the IGBT 24 turns off, the current will decay exponentially back to 11 as the inductor discharges into the load at any load voltage. Note: current $I_2$ must always remain below the critical value to prevent a runaway condition and $I_1$ must not be allowed to drop below the minimum maintenance threshold if generation is intended to be self-sustaining while switch S1 is open.

Exponential Wave-Form:

Dotted lines extending from the saw-tooth waveform of FIG. 7 indicate the exponential rise and fall of current if allowed to continue unimpeded by the load voltage. The generator equivalent circuit is essentially that of a standard RL resistor-inductor circuit with a time constant t=L/R. Where R is passive as in a typical dissipative circuit, its algebraic sign is positive and the charge-discharge current waveform follows the traditional textbook equation of $I_2=I_1 \exp(-tR/L)$. However, in the generative mode, the sign of R is negative which transforms the equation to $I_2=I_1 \exp(tR/L)$ and the resulting waveform is inverted as shown in FIG. 7.

Figure 8:
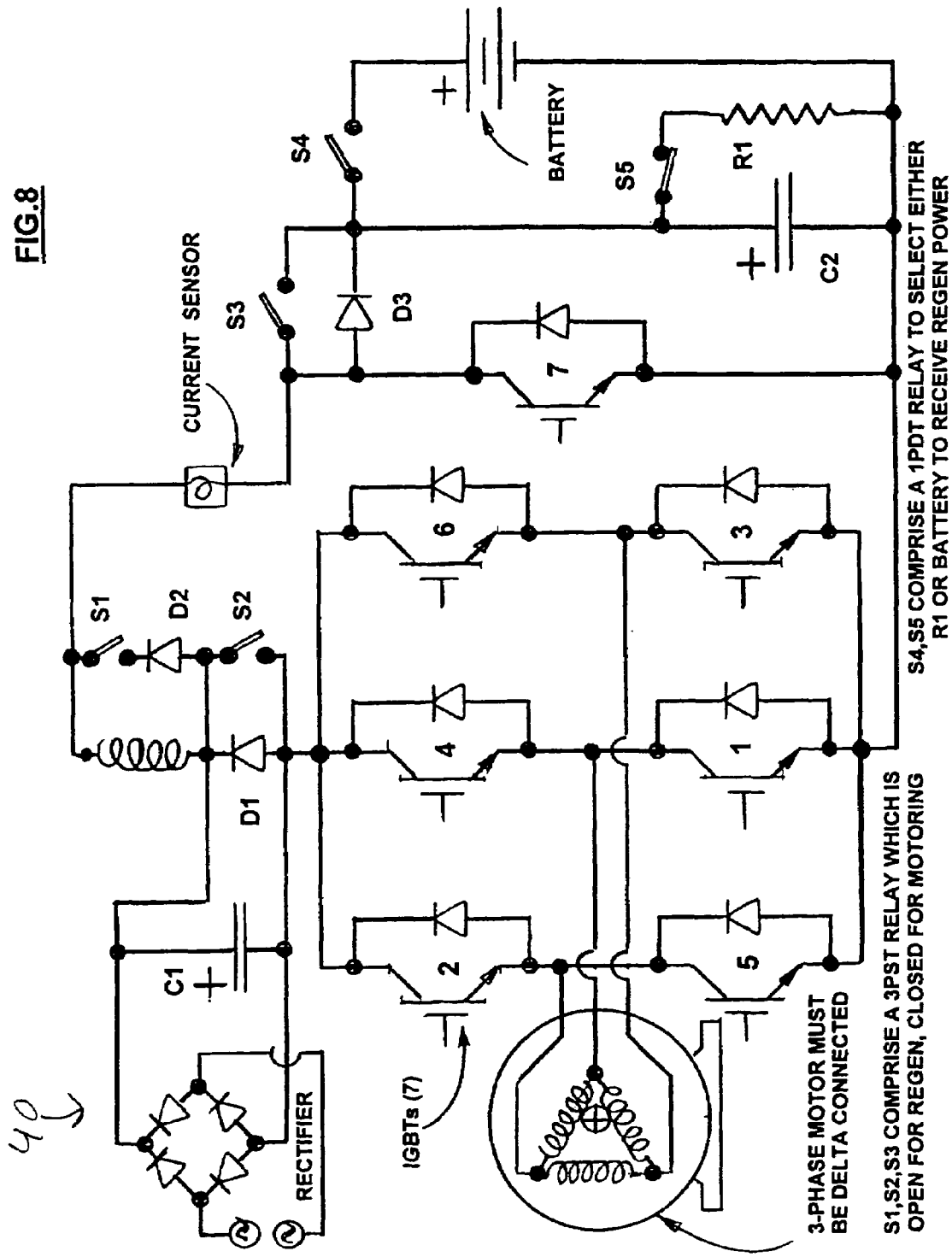
FIG. 8 is a circuit diagram for a motor/generator of the present invention.

Delta Connection:

The 3-phase generator stator is connected in the delta configuration shown in FIG. 8 rather than a wye connection. Either delta or wye may be used in the motor mode but preferably the delta connection is used in the generator mode. Thus in a "mogen" (motor generator) application, the machine must be delta-connected.

Motor/Generator:

The combination of motor and generator modes into one circuit 40 is shown in FIG. 8 which represents the integration of FIG. 3 and FIG. 6 into one circuit. Note that the intrinsic diodes contained within the IGBTs of FIG. 3 serve as the 3-phase full-wave rectifier of FIG. 6. Notice also that the integrated "mogen" format of FIG. 8 employs the delta connection.

Switches S1, S2, and S3 are required to change between motoring and generating functions. In some situations the 3PST relay comprising S1, S2, and S3 may be replaced with three solid-state switches such as IGBTs.

If the load battery is fully charged, excess generator power may be dissipated across load resistor R1 via the 1PDT relay comprising S4 and S5

Integral Battery Charger:

Non-rotation of the shaft reduces the value of $R_D$ to zero. Now the total machine appears as a pure inductor and the motor circuit may be employed as a switched-mode power supply or chopper circuit to transform voltages. The motor-generator circuit of FIG. 8 may serve as an on-board battery charger where input power low voltage is introduced across diode D1. Turn-on of IGBT #7 causes the "mogen" inductor to charge with magnetic energy across the rotor-stator gap. Upon turn-off of IGBT #7, the magnetic energy dumps into the main drive battery pack at a voltage several times higher than the source voltage across D1. The battery charger has a charging capacity as determined by the power rating of the motor/drive system. Incorporating this "integral battery charger" eliminates the necessity of an external charging system. The charger is carried within the vehicle without addition of space, weight or cost to any convenient DC power source that may, in fact, be of any available voltage. No exact voltage needs to be specified at the input so long as it is within the voltage rating of the solid-state switches.

The motor/generator of the present invention possesses the outstanding attributes of all prior-art designs without their drawbacks. It operates at full flux density and optimum torque angle to achieve the high torque of a brush-type DC machine. It also operates at the high speed of a brushless DC machine These three factors combined, namely, full flux density, 90° torque angle and high shaft speed, are unattainable in any conventional motor/generator. Together they give a three-fold increase in power density at high efficiency which approaches the theoretical limits of any electrical rotating machine.

Magnetic Gap Energy

Magnetic energy is the product of flux squared and circuit reluctance. The size of the machine dictates the amount of flux while magnetic circuit properties account for the reluctance. Thus the ability to extract useful mechanical work from an electromagnetic device depends upon two fundamental machine properties: 1) quantity of flux contained within the device as determined by overall physical size of the magnetic core (iron or ferrite); 2) reluctance, or magnetic resistance, offered by the device's magnetic circuit for maintaining a magnetic field. Stored magnetic energy is expressed mathematically as:

$$E_{MAG} = k\theta^2 \mathfrak{R} \qquad \text{Eq. 1}$$

where: $E_{MAG}$=magnetic energy; k=proportionality constant; θ=total magnetic flux; $\mathfrak{R}$ =circuit reluctance Notice the similarity of Eq. 1 to dissipative power $P_R$ in a resistive electric circuit given as $P_R=I^2 R_R$, where I represents electric current and $R_R$ is the electric circuit resistance to maintaining current flow.

According to the Law of Equi-partition of Energy, input energy is equally divided between stored magnetic energy and mechanical energy. Thus mechanical energy is equal to stored magnetic energy, or:

$$E_{MECH} = k\theta^2 \mathfrak{R} = E_{MAG} \text{ where: } E_{MECH} = \text{mechanical energy; and} \qquad \text{Eq. 2}$$

$$E_{ELECTRICAL\ TOTAL\ INPUT} = (E_{MAG} + E_{MECH})$$
$$= 2E_{MAG} = 2E_{MECH} = 2k74^2 \mathfrak{R} \qquad \text{Eq. 3}$$

Typical of all electromagnetic devices, an electric motor possesses an iron core of high magnetic permeability (analogous to electrical conductivity) for maximizing flux content within the machine core. High permeability minimizes flux leakage and helps contain flux within the physical confines of the machine. The iron core also provides a magnetic conduit, or circuit, for conducting flux through electrical coils embedded within the stator and rotor. So it is desirable to employ a core material of high permeability, such as iron, as the primary magnetic circuit conductor. In short, the iron core functions to provide maximum flux with the least reluctance.

However, there is an optimum tradeoff between flux content and reluctance. As shown by Eq. 2, mechanical energy output depends on a high value of both flux and reluctance and not upon developing one at the expense of the other as prevails in conventional motors and generators.

Circuit reluctance $\mathfrak{R}$ is inversely proportional to core permeability $\mu_{MAG}$. High permeability results in low reluctance which in turn restricts the energy potential of the device a shown in Eq. 2. Yet a low permeability material would prevent achieving the high flux levels necessary for torque production without incurring high resistive losses in the windings due to the high "magnetizing current" required.

An optimum balance exists between the conflicting demands of high flux and high reluctance where high torque is possible within the bounds of acceptable energy efficiency.

Reluctance may be increased without resorting to low permeability material by simply including a relatively small air gap within the magnetic circuit. Permeability of air is nearly 10,000 times less than that of iron so that a small gap length, relative to overall core length, will have a large effect on the net reluctance of the magnetic circuit. In fact, a machine designed for optimal performance will incorporate a gap that dominates circuit reluctance so that core reluctance may be considered negligible with all circuit reluctance arising from the air gap. This may be demonstrated as follows:

Let air gap reluctance $\mathfrak{R}_{AIR}$ be defined as:

$$\mathfrak{R}_{AIR} = L_{GAP}/A_{MAG}\mu_{AIR} \qquad \text{Eq. 4}$$

where: $L_{GAP}$=longitudinal length of air gap; $A_{MAG}$=cross-sectional area of magnetic circuit; and $\mu_{AIR}$=permeability of air.

Core reluctance $\mathfrak{R}_{CORE}$ is defined as:

$$\mathfrak{R}_{CORE} = L_{CORE}/A_{MAG}\mu_{CORE} \qquad \text{Eq. 5}$$

where: $L_{CORE}$=iron core length; $\mu_{CORE}$=permeability of iron core

Total magnetic circuit reluctance $\mathfrak{R}_{TOTAL}$ is simply the sum of reluctances comprising the iron core and the imposed air gap and is given by:

$$\mathfrak{R}_{TOT} = (\mathfrak{R}_{AIR} + \mathfrak{R}_{CORE}) = [L_{GAP}/\mu_{AIR} + L_{CORE}/\mu_{CORE}]/A_{MAG} \qquad \text{Eq. 6}$$

Eq. 6 shows that a relatively small air gap $L_{GAP}$ accompanied by the very low permeability of air $\mu_{AIR}$ can overwhelm the effects of a much longer core length $L_{CORE}$ when divided by the extremely large permeability of iron $\mu_{CORE}$.

Thus, as with any magnetic gapped structure, the gap becomes the chief source of reluctance. The gap thereby endows the device with a capacity for holding a large amount of magnetic energy residing mostly in the air gap proper and to a much lesser extent in the iron core.

As explained above, mechanical output energy is equivalent to magnetic energy contained within the device. A magnetic gapped structure holds most of its magnetic energy in the gap because the gap constitutes most of the reluctance, as indicated by Eq. 1. Therefore the mechanical energy delivered by the shaft is nearly equal to the magnetic gap energy stored in the air gap.

An ideal device would utilize a perfect magnetically conductive medium as a core material, i.e., a material possessing "super-conductive" properties of infinite permeability. But such a device would be incapable of producing any mechanical energy whatsoever in the absence of an intentional gap of low permeability interposed somewhere in the magnetic circuit. In other words, even though the ideal core may have infinite permeability, somewhere within the magnetic circuit there must be a region of low permeability in order to render the motor operative.

In the case of an electric motor, the obvious location for creating a region of low permeability, i.e. a region of energy storage, would be the gap already existing between rotor and stator as running clearance. Simply enlarging the rotor-stator gap beyond that necessary to avoid mechanical interference will permit greater storage of magnetic energy with an accompanying increase in mechanical energy at the shaft.

Traditional motor design philosophy, ever since the invention of the 3-phase AC induction motor by Nicola Tesla in 1888, has sought to minimize the rotor-stator air gap for the sole purpose of raising motor efficiency by lowering heat-generating magnetizing current. Reducing the gap does indeed improve efficiency but at the expense of literally pinching off the torque producing potential of the motor. This ironic circumstance derives from an incomplete understanding of the most fundamental theory governing operation of all electromagnetic devices intended to generate force and torque, namely, the Law of Equi-partition of Energy. Numerous ramifications of this law of physics extend even into electric motor design and must be incorporated into any comprehensive electromagnetic theory of machine performance.

A complete theory grounded in "first principles" reveals the equivalence of mechanical work and stored magnetic energy as expressed by Eq. 2. This exact equivalency has universal application to every conceivable type of force/torque producing electromagnetic machine as an inescapable consequence of the Law of Equi-partition of Energy. Master equations embracing this Law indicate a substantial increase in motor torque over prior-art without adversely impacting efficiency when certain corrective measures are implemented, such as replacing aluminum rotor bars with solid copper in the squirrel cage rotor of an AC induction motor, for example.

Optimized Winding Format

Torque created by a rotary electromagnetic machine is proportional to the total flux contained within the magnetic core. In turn, total flux determines the induced winding voltage. Therefore, back EMF (motor) or forward EMF (generator) is a direct indicator of the torque capacity of the machine.

Windings in a conventional non-salient pole machine do not completely utilize the available core cross-sectional area for containment of flux. A novel winding pattern is proposed for a distributed winding which maximizes the effective area encompassed by the coils to significantly raise induced voltage with a corresponding increase in torque production.

The standard lap winding is retained with legs of the coils spanning several times more core area than achieved in standard practice. Consequently, more flux is generated for a fixed level of heat generation by allowing most of the flux to penetrate all of the coils.

Theoretical Background:

The ability of a rotary electromagnetic machine to produce torque is directly proportional to the total magnetic flux $\theta$ penetrating the effective coil area A encompassed within the coils as expressed by Eq. 7:

$$T = (NI)\theta = (NI)AB \qquad \text{Eq. 7}$$

where: T=torque; (NI)=amp-turns; $\theta$=magnetic flux;
A=effective core area conducting flux; and
B=magnetic flux density (Note: For the sake of simplicity, dissipative losses have been ignored throughout this analysis as negligible in an efficient machine.)

While amp-turns (NI) varies according to machine size, its maximum value for any given machine is determined by heat dissipation and efficiency requirements. Flux density B is limited by saturation of the magnetic core. Total cross-sectional area of the magnetic core is obviously a function of machine size, but the effective area A through which flux passes is a function of the winding pattern as well as overall machine size and is therefore amenable to modification for enhancing machine performance.

One of the most important qualities for assessing machine design is the magnitude of induced voltage in the windings either as back EMF for a motor or forward EMF for a generator. Induced voltage is given as:

$$V = Nw\,\theta = NwAB \qquad \text{Eq. 8}$$

where: V=induced winding voltage; N=number of turns; w=angular frequency

At a given frequency, the only variable parameter is effective area A which, again, is not only a function of machine size, but of the winding pattern that determines effective utilization of the gross machine core cross-sectional area.

Thus induced voltage corresponds directly to the torque-producing capability of a motor or generator as shown by substituting Eq. 8 into Eq. 7 to yield:

$$T=IV/w \qquad \text{Eq. 9}$$

Since machine power P is simply the product of torque T and angular frequency w, then:

$$P=Tw=IV \qquad \text{Eq. 10}$$

In short, the actual physical core area alone does not accurately represent the full toque potential, but rather the effective utilization of that area, i.e., the effective area A as used in the above equations. And the effective area is, to a large extent, dependent upon the particular format in which the core is wound in addition to the mechanical core cross-sectional area.

The core area enclosed by a winding coil is termed the effective area A. Only this area conducts flux within the confines of the coil's physical perimeter to generate voltage in the coil. Flux flowing outside the coil interior cannot induce a voltage and therefore has no effect in producing torque.

Prior-Art Winding Format

Figure 9:
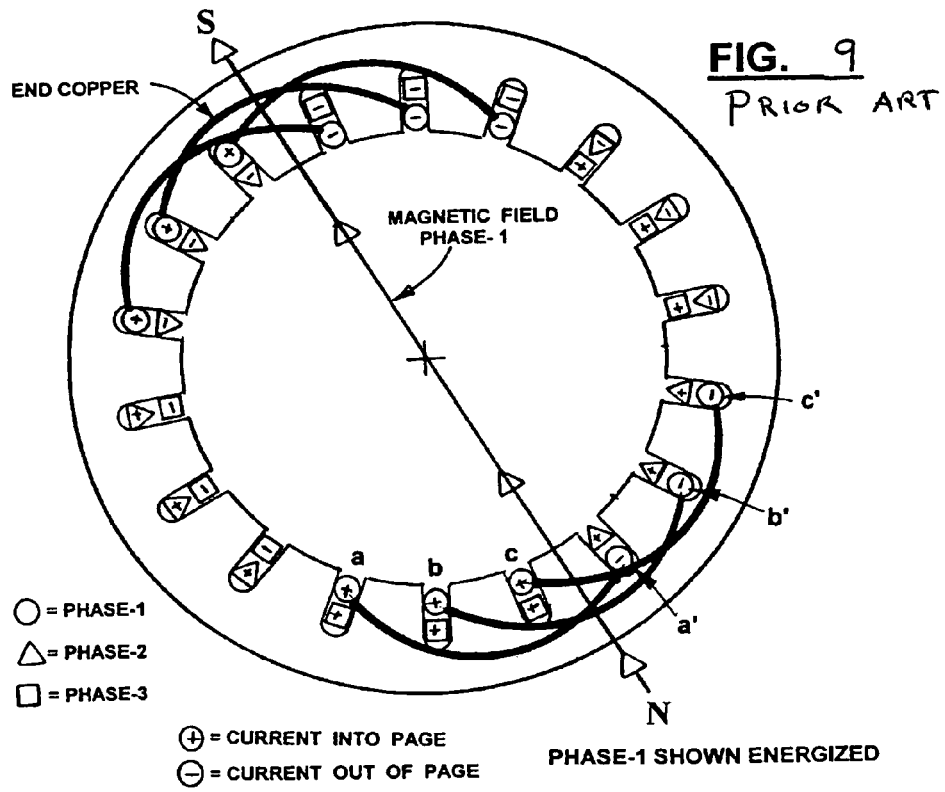
FIGS. 9 and 10 are winding patterns for conventional motors.
Figure 10:
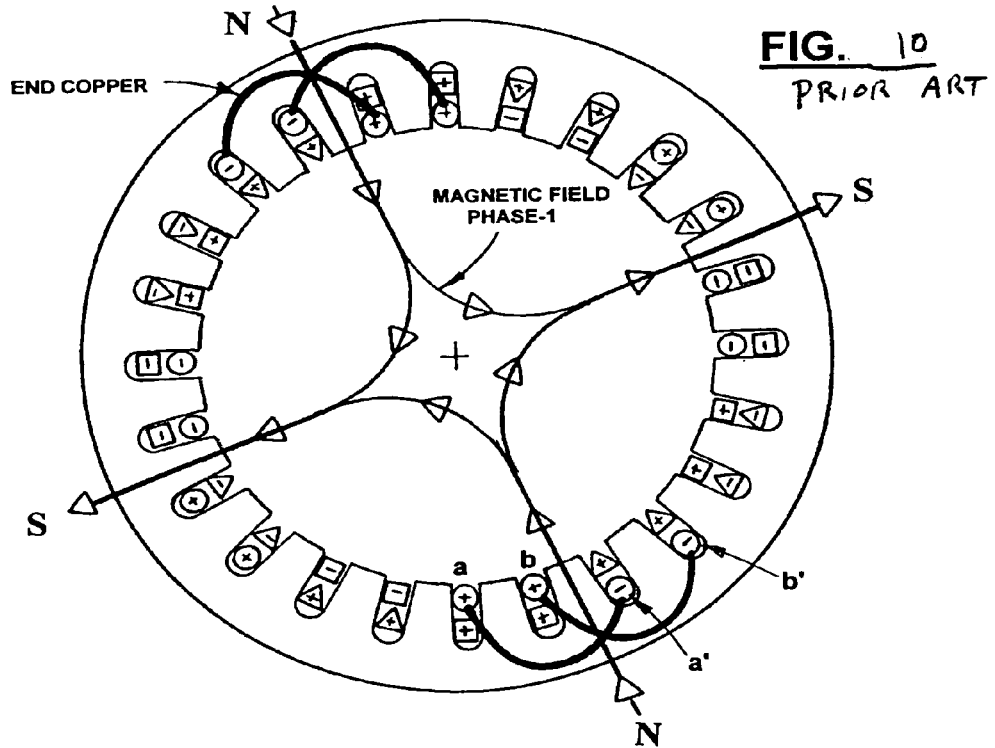

FIGS. 9 and 10 show the traditional stator winding format found in machines with imbedded windings for a 2-pole and 4-pole design, respectively. Imbedded windings fill slots carved within the stator core as opposed to salient pole windings in which coils wrap around the circumference of protruding (salient) poles. Imbedded windings do not have the advantage of completely enveloping the entire mechanical core area available but of necessity must be distributed among several slots traversing the face of the core pole area. For this reason, such windings are termed distributed windings. Unlike salient pole windings, the actual physical core area in which distributed windings are imbedded does not necessarily correspond to the effective area A as required for torque production.

Loss of effective area A accompanying distributed windings is clearly understood in machine theory and the penalty accrued in degradation of induced voltage is accounted for in conventional machine design. Yet it is possible to arrange winding coils within the slots as to mitigate the chief drawback of distributed windings and obtain the same benefit found in salient pole windings.

FIGS. 9 and 10 show end copper conductors for two poles of phase-1 only. The other two phases are similarly connected at the ends but this depiction has been omitted for clarity. Notice how the end copper of one coil overlaps that of an adjacent coil which explains why this format is often referred to as a lap winding.

End copper forms continuous loops connecting the coil legs lying within the slots. Coil legs are here defined as those portions of the coils imbedded within the stator and/or rotor slots For instance, in FIG. 9 for a 2-pole machine, legs a and a' together constitute a coil connected at the ends as shown. Legs b–b' and c–c' represent two more coils. All three coils are connected in series to comprise a single effective coil that is distributed among six slots for one pole of phase-1.

The second pole of phase-1 is identical except with the external effective coil connections reversed so that flux is directed radially outward whereas flux from the first pole is directed radially toward the center.

The mechanical cross-sectional area available for conducting flux within the overall coil envelop spans five core teeth but the effective area A of the individual coils only spans three teeth. Thus the induced voltage and corresponding torque are reduced by 40% as compared to a salient pole machine in which all the coil copper surrounds the magnetic core area represented by the five teeth.

Figure 11:
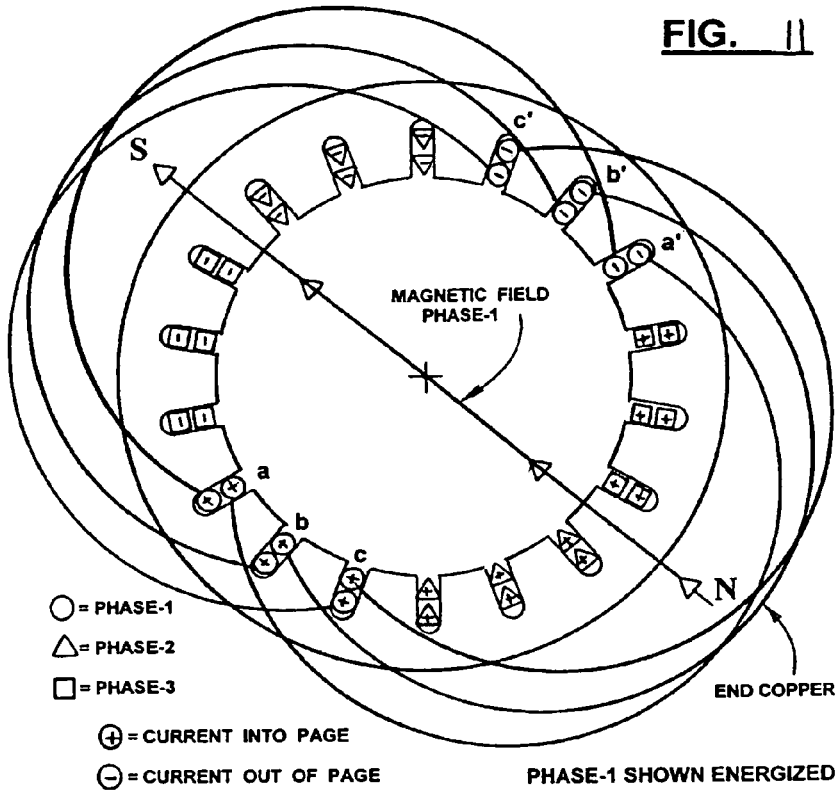
FIGS. 11 and 12 are optimized winding patterns for the motor of the present invention.
Figure 12:
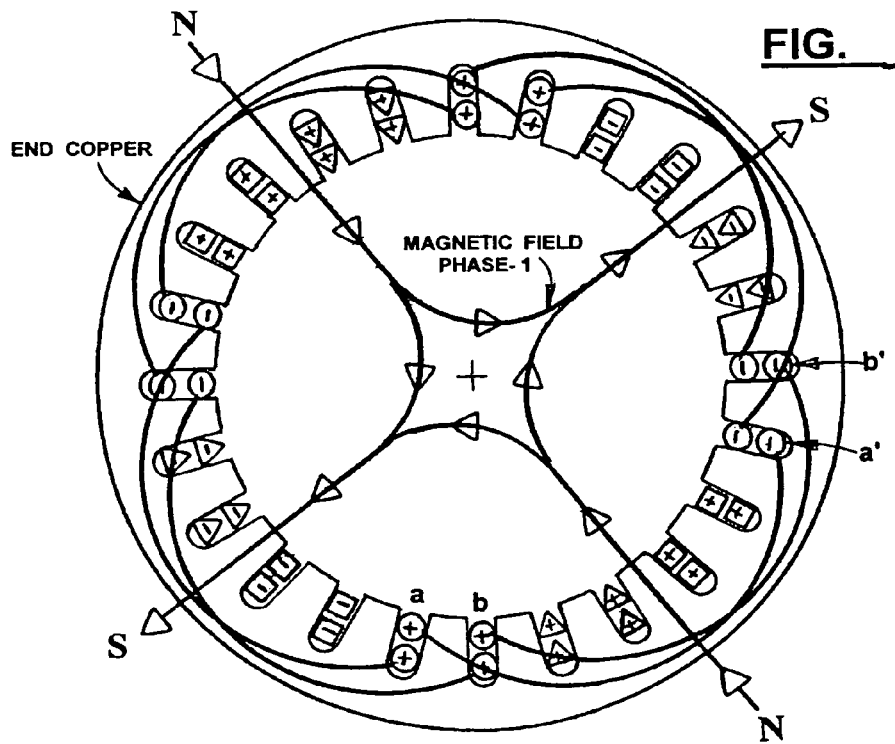

Optimized Winding Format:

FIGS. 11 and 12 portray the optimized winding layout constituting essential embodiment this invention. Although 2-pole and 4-pole machines are shown respectively in FIGS. 11 and 12, other pole numbers also fall within the proprietary purview as well. Only the end copper associated with two poles of phase-1 is shown for clarity. Notice the large flux conducting area threading the coil legs a and a' and similarly for legs of coils b–b' and c–c' as compared to the corresponding area in the conventional formats of FIGS. 9 and 10.

End copper must span a greater distance in order to facilitate the enlarged effective core area A, as would be expected. Depending on the rotor length-to-diameter ratio, this increase in copper resistance may vary from 10% to 50%. However, the consequent increase in effective area A may reach 300% over that of conventional winding practice. This small rise in heat generation is vastly offset by the large gain in potential torque production.

As mentioned previously, flux is the product of effective area A and flux density B. Because B is fixed by the saturation limit of the core material, area A is the only variable for manipulating total flux θ obtainable from amp-turns (NI) where flux θ is fundamental to torque toque production as shown in Eq. 7, or equivalently, to induced voltage V generation as shown by Eq. 8.

Figure 13:
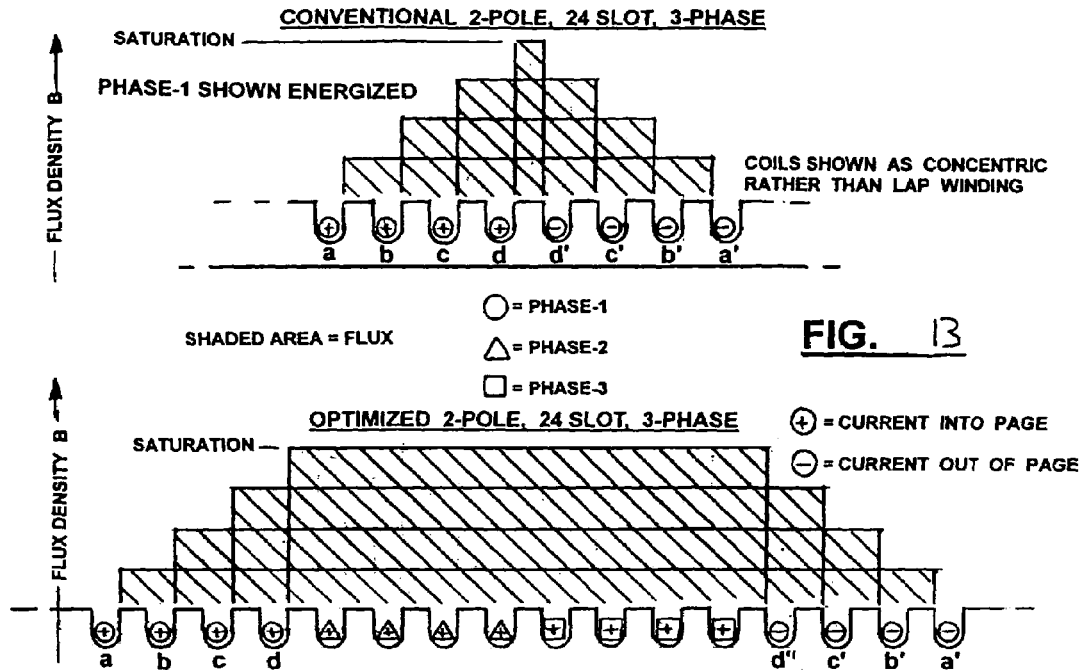
FIGS. 13 and 14 are flux density diagrams for the optimized winding patterns of FIGS. 11 and 12.
Figure 14:
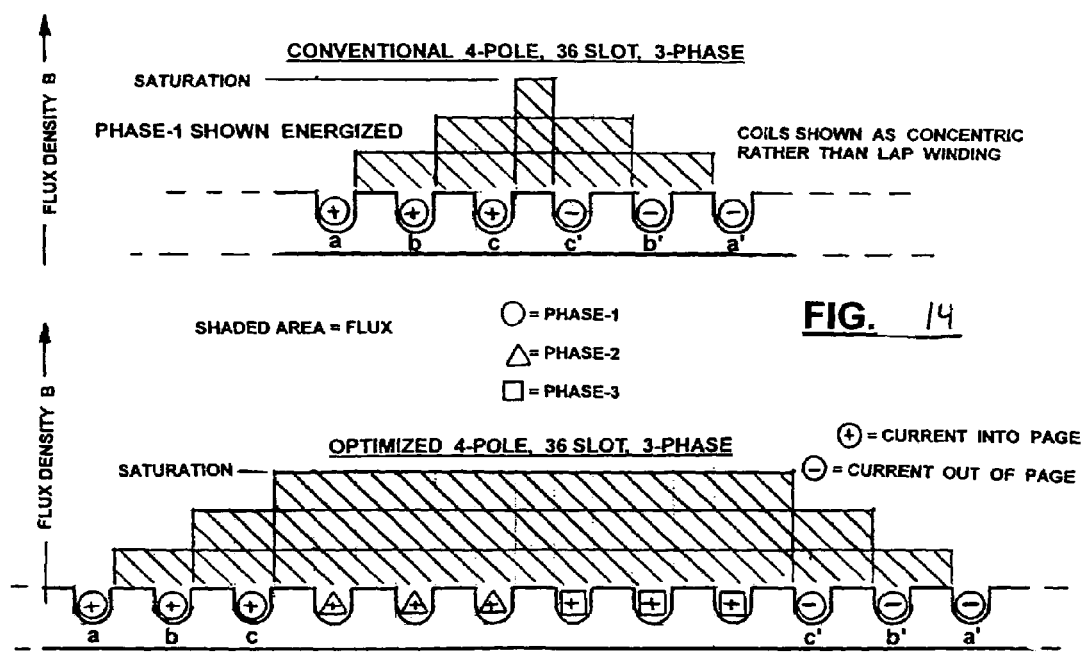

FIGS. 13 and 14 represent a circular stator laid out linearly for ease of evaluating flux enhancement arising from the winding innovation as compared to prior practice.

FIG. 13 is the 2-pole linear analog of FIGS. 9 and 11. Eight slots are shown for the effective coil of one pole in one phase because an extra slot has been added per pole per phase. Therefore the 18 slot stator of FIG. 9 has now become a 24 slot stator due to the total of six extra slots ($6=2_{poles} \times 3_{phases}$). This change in slot number simply proves that the number of slots employed has no effect upon the results obtained from the methodology of this innovation. As a rule, the number of slots in a 2-pole, 3-phase machine must always be a multiple of six.

FIG. 14 is the 4-pole linear analog of FIGS. 11 and 12. Here the number of slots, 36, has also been increased by one slot per pole per phase, namely, 12 additional slots in the linear representation as compared to 24 in the circular. As a rule, the number of slots in a 4-pole, 3-phase machine must always be a multiple of 12 since $12=4_{poles} \times 3_{phases}$.

Amp-turns (NI) required to develop a magnetic field of flux density B is independent of the magnetic cross-sectional (core) area as demonstrated by Eq. 11:

$$(NI)=Bh/\mu_{net} \qquad \text{Eq. 11}$$

where: h=length of magnetic circuit; $\mu_{net}$=net permeability of the magnetic circuit including the air gap.

Flux θ=AB of any magnitude can be produced from the same amp-turns (NI) because, although maximum B is fixed at the saturation level, there is no limitation on core A area imposed by Eq. 11.

The only restriction to creating more flux from the same amp-turns is the physical core area available (machine size), and the only negative effect is the increased ohmic resistance due to surrounding the larger area with longer coil lengths. Performance benefits gained by enclosing a larger core area far exceeds the resulting slight rise in thermal losses so that there is an overall improvement in machine efficiency.

In FIGS. 13 and 14, the coils have been relabeled for convenience of analysis. Rather than the lap pattern of FIGS. 9–12, the windings are shown as concentric or nested coils in FIGS. 13 and 14. This has no effect upon the magnetic fields produced, all else being equal. Coil a–a' in FIGS. 13, 14 now has legs in the outermost slots, the remaining coils progressing concentrically toward the center with coil d–d' filling the inner slots of FIG. 13 and c–c' filling the inner slots of FIG. 14.

Each coil produces magnetic flux independent of the others with each individual coil producing the same flux density B because all are connected in series to form a single effective pole coil. The flux densities are additive so that peak flux density occurs at the center of the pole, passing through the inner coils (c–c' or d–d'), diminishing outwardly toward the coil encircling the largest area, namely coil a–a'.

Outer coil a–a' encompasses all of the flux contained within its interior while the inner coil, say d–d', encloses only a fraction of the total flux. Therefore, induced voltage in the largest coil a–a' will be significantly higher than voltage induced in the smallest coil d–d'. This disparity would be mitigated by placing all of the coils in the outermost slots along side of coil a–a'. However, the physical construction of a non-salient pole motor makes this remedy impossible and necessitates distribution of a single effective coil among multiple slots along the pole face.

While coil distribution is unavoidable in a non-salient pole machine, it is possible to arrange the coils in a manner that encloses much more core area A than conventional practice permits. The shaded areas (cross-hatched) above the linear coil layout in FIGS. 13 and 14 are proportional to the total flux generated by the coils. Both the conventional and optimized depictions are based on the same amp-turns (NI) in all of the coils The difference in flux is simply due to the physical format of the coils themselves wherein the optimized design encompasses more area than that of the prior-art. Assuming negligible differences in coil resistance due to slightly longer end copper, essentially the same electrical energy is expended in producing the highly disparate levels of magnetic flux in the two cases, conventional vs. optimized.

It can be shown mathematically that, for a 3-phase machine, the innovative winding format described herein will result in three-fold maximum increase in total flux θ and a factor-of-4 increase in induced coil voltage V. This result is based on an idealized model of an infinite number of infinitely small alternating slots and teeth. An implementation of several slots and teeth yields a stepped characteristic as shown in FIGS. 13 and 14 so that theoretical limits can be reasonably approached but not fully realized in a practical machine. The effect of winding optimization will vary with the number of phases involved but is independent of the number of poles as evidenced in FIGS. 13 and 14.

It will be appreciated by those of ordinary skill in the art that the concepts and techniques described here can be embodied in various specific forms without departing from the essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. An electromagnetic motor, comprising:
    a rotor;
    a stator;
    a rotor coil configured to generate a single-phase magnetic field, the single-phase magnetic field being rotationally fixed with respect to the rotor when excited from a direct current electrical energy source;
    at least two stator coils configured to generate a poly-phase magnetic field that rotates with respect to the stator; and
    a plurality of switches configured to generate the poly-phase magnetic field from the direct current electrical energy source such that the rotor rotates in response thereto;
    the rotor coil being coupled in series with the direct energy source and the plurality of switches.

2. The motor of claim 1 wherein the electromagnetic motor includes three stator coils, each of the stator coils being configured to generate a magnetic filed shifted with respect to a magnetic field generated by an adjacent stator coil.

3. The motor of claim 2 wherein each of the stator coils is configured to generate a magnetic field shifted 60° from an adjacent stator coil.

4. The motor of claim 2 wherein the electromagnetic motor includes six switches for generating the magnetic field of each of the stator coils.

5. The motor of claim 4 wherein the switches are IGBT switches.

6. The motor of claim 4 wherein three switches are turned on at one time.

7. The motor of claim 4 wherein two switches are turned on at one time.

8. The motor of claim 2 wherein the stator coils are connected in a wye configuration.

9. The motor of claim 2 wherein the stator coils are connected in a delta configuration.

10. The motor of claim 2 further comprising an air gap between the stator and rotor coils that is configured to increase the reluctance of the motor and thereby increase the torque generated by the motor.

11. A method for generating torque from a shaft of an electric motor having a rotor and a stator, the method comprising the following steps:
    generating a single-phase magnetic field with a rotor coil of the electric motor, the single-phase magnetic field being rotationally fixed with respect to the rotor when excited from a direct current electrical energy source; and
    generating a poly-phase magnetic field with respective stator coils such that the poly-phase magnetic field rotates with respect to the stator;
    wherein a plurality of switches are used to generate the poly-phase magnetic field from the direct current electrical energy source such that the rotor rotates in response thereto;

wherein the rotor coil is connected is series with the direct current electrical energy source and the plurality of switches.

12. The method of claim 11 wherein three magnetic fields are generated by three stator coils.

13. The method of claim 12 wherein each of the stator coils is configured to generate a magnetic field shifted 60° from an adjacent stator coil.

14. The method of claim 12 wherein six switches generate the magnetic field from each of the stator coils.

15. The method of claim 14 wherein the switches are IGBT switches.

16. The method of claim 14 further comprising the step of switching three of the switches on at the same time.

17. The method of claim 14 further comprising the step of switching two of the switches on at the same time.

18. The method of claim 12 wherein the stator coils are connected in a wye configuration.

19. The method of claim 12 wherein the stator coils are connected in a delta configuration.

20. The method of claim 12 further comprising the step of storing magnetic energy in an air gap between the stator and rotor in order to increase the reluctance of the motor and thereby increase the torque generated by the motor.

* * * * *